(12) United States Patent
McCullough et al.

(10) Patent No.: US 10,275,780 B1
(45) Date of Patent: Apr. 30, 2019

(54) METHOD AND APPARATUS FOR SENDING A REBATE VIA ELECTRONIC MAIL OVER THE INTERNET

(75) Inventors: Joseph R. McCullough, Delaware, OH (US); Dean K. Lehman, Columbus, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 3071 days.

(21) Appl. No.: 09/707,587

(22) Filed: Nov. 7, 2000

Related U.S. Application Data

(63) Continuation-in-part of application No. 09/448,738, filed on Nov. 24, 1999, now Pat. No. 8,571,975.

(51) Int. Cl.
*G06Q 30/00* (2012.01)
*G06Q 30/02* (2012.01)

(52) U.S. Cl.
CPC .................... *G06Q 30/02* (2013.01)

(58) Field of Classification Search
CPC .............................. G06Q 30/02; G06Q 30/00
USPC ........................................ 705/14, 14.1–14.73
See application file for complete search history.

(56) References Cited

U.S. PATENT DOCUMENTS

| | | |
|---|---|---|
| 3,896,266 A | 7/1975 | Waterbury |
| 3,938,091 A | 2/1976 | Atalla et al. |
| 4,321,672 A | 3/1982 | Braun et al. |
| 4,567,359 A | 1/1986 | Lockwood |
| 4,633,397 A | 12/1986 | Macco |
| 4,695,880 A | 9/1987 | Johnson et al. |
| 4,696,491 A | 9/1987 | Stenger |
| 4,713,761 A | 12/1987 | Sharpe et al. |
| 4,725,719 A | 2/1988 | Oncken et al. |
| 4,745,468 A | 5/1988 | Von Kohorn |
| 4,799,156 A | 1/1989 | Shavit |
| 4,801,787 A | 1/1989 | Suzuki |
| 4,823,264 A | 4/1989 | Deming |
| 4,882,675 A | 11/1989 | Nichtberger et al. |
| 4,926,255 A | 5/1990 | Von Kohorn |

(Continued)

FOREIGN PATENT DOCUMENTS

| | | |
|---|---|---|
| CA | 2430549 | 6/2002 |
| DE | 19731293 | 1/1999 |

(Continued)

OTHER PUBLICATIONS

Kutler, A Different Drummer on the Data Highway, American Banker, Section: No. 91, vol. 160, May 12, 1995, p. 14.

(Continued)

*Primary Examiner* — Arthur Duran
(74) *Attorney, Agent, or Firm* — Hunton Andrews Kurth LLP

(57) ABSTRACT

A method and apparatus are disclosed for transferring money representing a rebate from a retailer or manufacturer to a customer/recipient via an electronic mail message over a computer network such as the Internet. The recipient purchases, either conventionally or via an online store, a product for which an electronic rebate applies. In one embodiment, the recipient acquires the product through a conventional sale and requests a rebate online. Using the product's universal product code and serial numbers as identifiers, the sale is authenticated, and a transaction processor completes a funds transfer between the retailer or manufacturer and the recipient.

34 Claims, 26 Drawing Sheets

(56) References Cited

U.S. PATENT DOCUMENTS

| | | | |
|---|---|---|---|
| 4,941,090 A | 7/1990 | McCarthy | |
| 4,964,043 A | 10/1990 | Galvin | |
| 4,992,940 A | 2/1991 | Dworkin | |
| 5,016,270 A | 5/1991 | Katz | |
| 5,050,207 A | 9/1991 | Hitchcock | |
| 5,084,816 A | 1/1992 | Boese | |
| 5,117,355 A | 5/1992 | McCarthy | |
| 5,157,717 A | 10/1992 | Hitchcock | |
| 5,189,606 A | 2/1993 | Burns et al. | |
| 5,202,826 A | 4/1993 | McCarthy | |
| 5,220,501 A | 6/1993 | Lawlor | |
| 5,233,654 A | 8/1993 | Harvey et al. | |
| 5,235,509 A | 8/1993 | Mueller et al. | |
| 5,241,594 A | 8/1993 | Kung | |
| 5,265,033 A | 11/1993 | Vajk | |
| 5,287,268 A | 2/1994 | McCarthy | |
| 5,297,026 A | 3/1994 | Hoffman | |
| 5,317,683 A | 5/1994 | Hager et al. | |
| 5,321,841 A | 6/1994 | East | |
| 5,351,186 A | 9/1994 | Bullock | |
| 5,381,332 A | 1/1995 | Wood | |
| 5,412,708 A | 5/1995 | Katz | |
| 5,420,405 A | 5/1995 | Chasek | |
| 5,446,740 A | 8/1995 | Yien | |
| 5,450,134 A | 9/1995 | Legate | |
| 5,450,537 A | 9/1995 | Hirai et al. | |
| 5,465,206 A | 11/1995 | Hilt et al. | |
| 5,467,269 A | 11/1995 | Flaten | |
| 5,473,143 A | 12/1995 | Vak | |
| 5,473,732 A | 12/1995 | Change | |
| 5,485,370 A | 1/1996 | Moss et al. | |
| 5,502,636 A * | 3/1996 | Clarke | 705/10 |
| 5,511,117 A | 4/1996 | Zazzera | |
| 5,513,102 A | 4/1996 | Auriemma | |
| 5,532,920 A | 7/1996 | Hartrick | |
| 5,534,855 A | 7/1996 | Shockley et al. | |
| 5,537,314 A | 7/1996 | Kanter | |
| 5,537,473 A | 7/1996 | Saward | |
| 5,544,086 A | 8/1996 | Davis et al. | |
| 5,546,452 A | 8/1996 | Andrews | |
| 5,551,021 A | 8/1996 | Harada | |
| 5,557,334 A | 9/1996 | Legate | |
| 5,557,518 A | 9/1996 | Rosen | |
| 5,560,008 A | 9/1996 | Johnson et al. | |
| 5,568,489 A | 10/1996 | Yien | |
| 5,570,295 A | 10/1996 | Isenberg | |
| 5,570,465 A | 10/1996 | Tsakanikas | |
| 5,576,951 A | 11/1996 | Lockwood | |
| 5,583,778 A | 12/1996 | Wind | |
| 5,590,197 A | 12/1996 | Chen | |
| 5,590,199 A | 12/1996 | Krajewski et al. | |
| 5,592,378 A | 1/1997 | Cameron | |
| 5,592,560 A | 1/1997 | Deaton et al. | |
| 5,594,837 A | 1/1997 | Noyes | |
| 5,598,557 A | 1/1997 | Doner | |
| 5,602,936 A | 2/1997 | Lynn | |
| 5,603,025 A | 2/1997 | Tabb | |
| 5,604,490 A | 2/1997 | Blakely et al. | |
| 5,606,496 A | 2/1997 | D'Agostino | |
| 5,611,052 A | 3/1997 | Dykstra | |
| 5,621,201 A | 4/1997 | Langhans | |
| 5,621,789 A | 4/1997 | McCalmont | |
| 5,621,812 A | 4/1997 | Deaton et al. | |
| 5,625,767 A | 4/1997 | Bartell | |
| 5,634,101 A | 5/1997 | Blau | |
| 5,638,457 A | 6/1997 | Deaton et al. | |
| 5,640,577 A | 6/1997 | Scharmer | |
| 5,642,419 A | 6/1997 | Rosen | |
| 5,644,493 A | 7/1997 | Motai | |
| 5,653,914 A | 8/1997 | Holmes et al. | |
| 5,657,383 A | 8/1997 | Gerber | |
| 5,659,165 A | 8/1997 | Jennings | |
| 5,664,115 A | 9/1997 | Fraser | |
| 5,666,493 A | 9/1997 | Wojcik et al. | |
| 5,671,285 A | 9/1997 | Newman | |
| 5,675,637 A | 10/1997 | Szlam et al. | |
| 5,675,662 A | 10/1997 | Deaton et al. | |
| 5,677,955 A | 10/1997 | Doggett et al. | |
| 5,678,046 A | 10/1997 | Cahill et al. | |
| 5,682,524 A | 10/1997 | Freund | |
| 5,684,870 A | 11/1997 | Maloney | |
| 5,689,100 A | 11/1997 | Carrithers et al. | |
| 5,692,132 A | 11/1997 | Hogan | |
| 5,699,528 A | 12/1997 | Hogan | |
| 5,703,344 A | 12/1997 | Bezy et al. | |
| 5,710,886 A | 1/1998 | Christensen et al. | |
| 5,710,887 A | 1/1998 | Chelliah | |
| 5,710,889 A | 1/1998 | Clark et al. | |
| 5,715,298 A | 2/1998 | Rogers | |
| 5,715,314 A | 2/1998 | Payne | |
| 5,715,399 A | 2/1998 | Bezos | |
| 5,715,402 A | 2/1998 | Popolo | |
| 5,715,450 A | 2/1998 | Ambrose | |
| 5,724,424 A | 3/1998 | Gifford | |
| 5,727,163 A | 3/1998 | Bezos | |
| 5,729,693 A * | 3/1998 | Holda-Fleck | 705/14 |
| 5,734,838 A | 3/1998 | Robinson | |
| 5,737,414 A | 4/1998 | Walker et al. | |
| 5,740,231 A | 4/1998 | Cohn et al. | |
| 5,761,288 A | 4/1998 | Gray | |
| 5,754,840 A | 5/1998 | Rivette | |
| 5,758,126 A | 5/1998 | Daniels et al. | |
| 5,758,328 A | 5/1998 | Giovannoli | |
| 5,761,647 A | 6/1998 | Boushy | |
| 5,761,661 A | 6/1998 | Coussenns | |
| 5,764,789 A | 6/1998 | Pare et al. | |
| 5,765,141 A | 6/1998 | Spector | |
| 5,765,143 A | 6/1998 | Sheldon | |
| 5,768,382 A | 6/1998 | Schnier et al. | |
| 5,774,122 A | 6/1998 | Kojima | |
| 5,778,178 A | 7/1998 | Arunachalam | |
| 5,784,562 A | 7/1998 | Diener | |
| 5,787,403 A | 7/1998 | Randle | |
| 5,787,404 A | 7/1998 | Fernandez-Holman | |
| 5,790,650 A | 8/1998 | Dunn | |
| 5,790,785 A | 8/1998 | Klug et al. | |
| 5,794,207 A | 8/1998 | Walker | |
| 5,794,259 A | 8/1998 | Kikinis | |
| 5,796,395 A | 8/1998 | De Hond | |
| 5,797,127 A | 8/1998 | Walker et al. | |
| 5,798,508 A | 8/1998 | Walker et al. | |
| 5,793,861 A | 9/1998 | Haigh | |
| 5,794,178 A | 9/1998 | Caid | |
| 5,802,498 A | 9/1998 | Comesanas | |
| 5,802,502 A | 9/1998 | Gell | |
| 5,805,719 A | 9/1998 | Pare et al. | |
| 5,815,657 A | 9/1998 | Williams et al. | |
| 5,815,683 A | 9/1998 | Vogler | |
| 5,818,936 A | 10/1998 | Moshayekhi | |
| 5,819,092 A | 10/1998 | Ferguson | |
| 5,819,285 A | 10/1998 | Damico | |
| 5,825,863 A | 10/1998 | Walker | |
| 5,825,870 A | 10/1998 | Miloslavsky | |
| 5,826,241 A | 10/1998 | Stein | |
| 5,826,245 A | 10/1998 | Sandberg-Diment | |
| 5,826,250 A | 10/1998 | Trefler | |
| 5,828,734 A | 10/1998 | Katz | |
| 5,828,751 A | 10/1998 | Walker et al. | |
| 5,828,812 A | 10/1998 | Khan et al. | |
| 5,828,833 A | 10/1998 | Belville et al. | |
| 5,832,460 A | 11/1998 | Bednar | |
| 5,832,476 A | 11/1998 | Tada | |
| 5,835,087 A | 11/1998 | Herz | |
| 5,835,580 A | 11/1998 | Fraser | |
| 5,835,603 A | 11/1998 | Coutts | |
| 5,838,906 A | 11/1998 | Doyle | |
| 5,842,178 A | 11/1998 | Giovannoli | |
| 5,842,211 A | 11/1998 | Horadan | |
| 5,844,553 A | 12/1998 | Hao | |
| 5,845,259 A | 12/1998 | West et al. | |
| 5,845,260 A | 12/1998 | Nakano et al. | |
| 5,847,709 A | 12/1998 | Card | |
| 5,848,143 A | 12/1998 | Andrews | |
| 5,848,400 A | 12/1998 | Chang | |

(56) References Cited

U.S. PATENT DOCUMENTS

| | | |
|---|---|---|
| 5,848,427 A | 12/1998 | Hyodo |
| 5,852,812 A | 12/1998 | Reeder |
| 5,857,079 A | 1/1999 | Claus et al. |
| 5,862,223 A | 1/1999 | Walker |
| 5,864,830 A | 1/1999 | Armetta et al. |
| RE36,116 E | 2/1999 | McCarthy |
| 5,866,889 A | 2/1999 | Weiss et al. |
| 5,870,718 A | 2/1999 | Spector |
| 5,870,724 A | 2/1999 | Lawlor |
| 5,870,725 A | 2/1999 | Belinger et al. |
| 5,871,398 A | 2/1999 | Schneier et al. |
| 5,873,072 A | 2/1999 | Kight |
| 5,873,096 A | 2/1999 | Lim |
| 5,880,769 A | 3/1999 | Nemirofsky |
| 5,883,810 A | 3/1999 | Franklin et al. |
| 5,884,032 A | 3/1999 | Bateman |
| 5,884,270 A | 3/1999 | Walker et al. |
| 5,884,272 A | 3/1999 | Walker et al. |
| 5,884,274 A | 3/1999 | Walker et al. |
| 5,884,288 A | 3/1999 | Chang |
| 5,889,863 A | 3/1999 | Weber |
| 5,892,900 A | 4/1999 | Ginter et al. |
| 5,898,780 A | 4/1999 | Liu et al. |
| 5,899,982 A | 5/1999 | Randle |
| 5,903,881 A | 5/1999 | Schrader |
| 5,909,486 A | 6/1999 | Walker et al. |
| 5,910,988 A | 6/1999 | Ballard |
| 5,913,202 A | 6/1999 | Motoyama |
| 5,914,472 A | 6/1999 | Foladare et al. |
| 5,915,244 A | 6/1999 | Jack et al. |
| 5,918,214 A | 6/1999 | Perkowski |
| 5,918,217 A | 6/1999 | Maggioncalda |
| 5,918,239 A | 6/1999 | Allen et al. |
| 5,920,847 A | 7/1999 | Kolling et al. |
| 5,921,864 A | 7/1999 | Walker et al. |
| 5,923,763 A | 7/1999 | Walker et al. |
| 5,926,796 A | 7/1999 | Walker et al. |
| 5,926,812 A | 7/1999 | Hilsenrath |
| 5,930,764 A | 7/1999 | Melchione |
| 5,952,639 A | 7/1999 | Ohki |
| 5,933,817 A | 8/1999 | Hucal |
| 5,933,823 A | 8/1999 | Cullen |
| 5,940,812 A | 8/1999 | Tengel et al. |
| 5,943,656 A | 8/1999 | Crooks |
| 5,944,824 A | 8/1999 | He |
| 5,945,653 A | 8/1999 | Walker et al. |
| 5,946,388 A | 8/1999 | Walker et al. |
| 5,933,816 A | 9/1999 | Zeanah |
| 5,933,827 A | 9/1999 | Cole |
| 5,947,747 A | 9/1999 | Walker et al. |
| 5,949,044 A | 9/1999 | Walker et al. |
| 5,949,875 A | 9/1999 | Walker et al. |
| 5,950,173 A | 9/1999 | Perkowski |
| 5,950,174 A | 9/1999 | Brendzel |
| 5,950,206 A | 9/1999 | Krause |
| 5,952,641 A | 9/1999 | Korshun |
| 5,953,710 A | 9/1999 | Fleming |
| 5,956,695 A | 9/1999 | Carrithers et al. |
| 5,958,007 A | 9/1999 | Lee et al. |
| 5,960,411 A | 9/1999 | Hartman et al. |
| 5,961,593 A | 10/1999 | Gabber et al. |
| 5,963,635 A | 10/1999 | Szlam et al. |
| 5,963,925 A | 10/1999 | Kolling et al. |
| 5,963,952 A | 10/1999 | Smith |
| 5,963,953 A | 10/1999 | Cram et al. |
| 5,966,695 A | 10/1999 | Melchione et al. |
| 5,966,699 A | 10/1999 | Zandi |
| 5,967,896 A | 10/1999 | Jorasch et al. |
| 5,969,318 A | 10/1999 | Mackenthun |
| 5,970,143 A | 10/1999 | Schneier et al. |
| 5,970,470 A | 10/1999 | Walker et al. |
| 5,970,478 A | 10/1999 | Walker et al. |
| 5,970,482 A | 10/1999 | Pham |
| 5,970,483 A | 10/1999 | Evans |
| 5,978,467 A | 11/1999 | Walker et al. |
| 5,978,780 A * | 11/1999 | Watson .......................... 705/40 |
| 5,983,196 A | 11/1999 | Wendkos |
| 5,987,434 A | 11/1999 | Libman |
| 5,987,454 A | 11/1999 | Hobbs |
| 5,987,498 A | 11/1999 | Athing et al. |
| 5,991,736 A | 11/1999 | Ferguson et al. |
| 5,991,738 A | 11/1999 | Ogram |
| 5,991,748 A | 11/1999 | Taskett |
| 5,991,751 A | 11/1999 | Rivette et al. |
| 5,991,780 A | 11/1999 | Rivette |
| 5,995,948 A | 11/1999 | Whitford |
| 5,995,976 A | 11/1999 | Walker et al. |
| 6,003,762 A | 11/1999 | Hayashida |
| 5,999,596 A | 12/1999 | Walker et al. |
| 5,999,907 A | 12/1999 | Donner |
| 6,000,033 A | 12/1999 | Kelly et al. |
| 6,001,016 A | 12/1999 | Walker et al. |
| 6,005,939 A | 12/1999 | Fortenberry et al. |
| 6,006,205 A | 12/1999 | Loeb et al. |
| 6,006,249 A | 12/1999 | Leong |
| 6,009,415 A | 12/1999 | Shurling et al. |
| 6,009,442 A | 12/1999 | Chen et al. |
| 6,010,404 A | 1/2000 | Walker et al. |
| 6,012,088 A | 1/2000 | Li et al. |
| 6,012,983 A | 1/2000 | Walker et al. |
| 6,014,439 A | 1/2000 | Walker et al. |
| 6,014,635 A | 1/2000 | Harris et al. |
| 6,014,636 A | 1/2000 | Reeder |
| 6,014,638 A | 1/2000 | Burge et al. |
| 6,014,641 A | 1/2000 | Loeb et al. |
| 6,014,645 A | 1/2000 | Cunningham |
| 6,016,810 A | 1/2000 | Ravenscroft |
| 6,018,714 A | 1/2000 | Risen, Jr. |
| 6,018,718 A | 1/2000 | Walker et al. |
| 6,024,640 A | 2/2000 | Walker et al. |
| 6,026,429 A | 2/2000 | Jones et al. |
| 6,032,134 A | 2/2000 | Weissman |
| 6,032,147 A | 2/2000 | Williams et al. |
| 6,038,547 A | 3/2000 | Casto |
| 6,038,552 A | 3/2000 | Fleischl et al. |
| 6,042,006 A | 3/2000 | Van Tilburg et al. |
| 6,044,362 A | 3/2000 | Neely |
| 6,045,039 A | 4/2000 | Stinson et al. |
| 6,049,778 A | 4/2000 | Walker et al. |
| 6,049,782 A | 4/2000 | Gottesman et al. |
| 6,049,835 A | 4/2000 | Gagnon |
| 6,055,637 A | 4/2000 | Hudson et al. |
| 6,061,665 A | 5/2000 | Bahreman |
| 6,064,987 A | 5/2000 | Walker et al. |
| 6,065,120 A | 5/2000 | Laursen et al. |
| 6,065,675 A | 5/2000 | Teicher |
| 6,070,147 A | 5/2000 | Harms et al. |
| 6,070,153 A | 5/2000 | Simpson |
| 6,070,244 A | 5/2000 | Orchier et al. |
| 6,073,105 A | 6/2000 | Sutcliffe et al. |
| 6,073,113 A | 6/2000 | Guinan |
| 6,075,519 A | 6/2000 | Okatani et al. |
| 6,076,072 A | 6/2000 | Libman |
| 6,081,790 A | 6/2000 | Rosen |
| 6,081,810 A | 6/2000 | Rosenzweig et al. |
| 6,085,168 A | 7/2000 | Mori et al. |
| 6,088,444 A | 7/2000 | Walker et al. |
| 6,088,451 A | 7/2000 | He et al. |
| 6,088,683 A | 7/2000 | Jalili |
| 6,088,686 A | 7/2000 | Walker et al. |
| 6,088,700 A | 7/2000 | Larsen et al. |
| 6,091,817 A | 7/2000 | Bertina et al. |
| 6,092,196 A | 7/2000 | Reiche |
| 6,095,412 A | 8/2000 | Bertina et al. |
| 6,098,070 A | 8/2000 | Maxwell |
| 6,101,486 A | 8/2000 | Roberts et al. |
| 6,104,716 A | 8/2000 | Crichton et al. |
| 6,105,012 A | 8/2000 | Chang et al. |
| 6,105,865 A | 8/2000 | Hardesty |
| 6,111,858 A | 8/2000 | Greaves et al. |
| 6,112,181 A | 8/2000 | Shear et al. |
| 6,115,690 A | 9/2000 | Wong |
| 6,119,093 A | 9/2000 | Walker et al. |
| 6,119,099 A | 9/2000 | Walker et al. |

(56) References Cited

U.S. PATENT DOCUMENTS

| | | | |
|---|---|---|---|
| 6,128,599 A | 10/2000 | Walker et al. | |
| 6,128,602 A | 10/2000 | Northington et al. | |
| 6,131,810 A | 10/2000 | Weiss et al. | |
| 6,134,549 A | 10/2000 | Regnier et al. | |
| 6,134,592 A | 10/2000 | Montulli | |
| 6,135,349 A | 10/2000 | Zirkel | |
| 6,138,106 A | 10/2000 | Walker et al. | |
| 6,138,118 A | 10/2000 | Koppstein et al. | |
| 6,141,651 A | 10/2000 | Riley et al. | |
| 6,141,666 A | 10/2000 | Tobin | |
| 6,144,946 A | 11/2000 | Iwamura | |
| 6,144,948 A | 11/2000 | Walker et al. | |
| 6,145,086 A | 11/2000 | Bellemore et al. | |
| 6,148,293 A | 11/2000 | King | |
| 6,151,584 A | 11/2000 | Papiemiak et al. | |
| 6,154,750 A | 11/2000 | Roberge et al. | |
| 6,154,879 A | 11/2000 | Pare et al. | |
| 6,161,182 A | 12/2000 | Nadooshan | |
| 6,164,533 A | 12/2000 | Barton | |
| 6,170,011 B1 | 1/2001 | Beck et al. | |
| 6,178,511 B1 | 1/2001 | Cohen et al. | |
| 6,182,052 B1 | 1/2001 | Fulton et al. | |
| 6,182,142 B1 | 1/2001 | Win et al. | |
| 6,182,225 B1 | 1/2001 | Hagiuda et al. | |
| 6,185,242 B1 | 2/2001 | Arthur et al. | |
| 6,189,029 B1 | 2/2001 | Fuerst | |
| 6,195,644 B1 | 2/2001 | Bowie | |
| 6,199,077 B1 | 3/2001 | Inala et al. | |
| 6,201,948 B1 | 3/2001 | Cook et al. | |
| 6,202,005 B1 | 3/2001 | Mahaffey | |
| 6,202,054 B1 | 3/2001 | Lawlor et al. | |
| 6,202,151 B1 | 3/2001 | Musgrave et al. | |
| 6,208,978 B1 | 3/2001 | Walker et al. | |
| 6,208,984 B1 | 3/2001 | Rosenthal | |
| 6,216,115 B1 | 4/2001 | Barrameda et al. | |
| 6,219,706 B1 | 4/2001 | Fan | |
| 6,222,914 B1 | 4/2001 | McMullin | |
| 6,226,623 B1 | 5/2001 | Schein et al. | |
| 6,226,679 B1 | 5/2001 | Gupta | |
| 6,227,447 B1 | 5/2001 | Campisano | |
| 6,230,148 B1 | 5/2001 | Pare et al. | |
| 6,243,688 B1 | 6/2001 | Kalina | |
| 6,243,816 B1 | 6/2001 | Fang et al. | |
| 6,253,327 B1 | 6/2001 | Zhang et al. | |
| 6,253,328 B1 | 6/2001 | Smith, Jr. | |
| 6,260,026 B1 | 7/2001 | Tomida et al. | |
| 6,266,648 B1 | 7/2001 | Baker, III | |
| 6,266,683 B1 | 7/2001 | Yehuda et al. | |
| 6,267,292 B1 | 7/2001 | Walker et al. | |
| 6,269,348 B1 | 7/2001 | Pare et al. | |
| 6,275,944 B1 | 8/2001 | Kao et al. | |
| 6,289,322 B1 | 9/2001 | Kitchen et al. | |
| 6,298,330 B1 | 10/2001 | Gardenswartz et al. | |
| 6,298,356 B1 | 10/2001 | Jawahar et al. | |
| 6,301,567 B1 | 10/2001 | Leong et al. | |
| 6,308,273 B1 | 10/2001 | Goertzel et al. | |
| 6,308,274 B1 | 10/2001 | Swift | |
| 6,311,275 B1 | 10/2001 | Jin et al. | |
| 6,317,838 B1 | 11/2001 | Baize | |
| 6,321,208 B1 * | 11/2001 | Barnett et al. | 705/14 |
| 6,324,524 B1 | 11/2001 | Lent et al. | |
| 6,327,573 B1 | 12/2001 | Walker et al. | |
| 6,327,578 B1 | 12/2001 | Linehan | |
| 6,330,543 B1 * | 12/2001 | Kepecs | 705/14 |
| 6,332,192 B1 | 12/2001 | Boroditisky et al. | |
| 6,336,104 B1 | 1/2002 | Walker et al. | |
| 6,343,279 B1 | 1/2002 | Bissonette et al. | |
| 6,345,261 B1 | 2/2002 | Feidelson | |
| 6,349,242 B2 | 2/2002 | Mahaffey | |
| 6,349,336 B1 | 2/2002 | Sit et al. | |
| 6,385,652 B1 | 5/2002 | Brown et al. | |
| 6,401,211 B1 | 6/2002 | Brezak, Jr. et al. | |
| 6,408,389 B2 | 6/2002 | Grawrock et al. | |
| 6,418,457 B1 | 7/2002 | Schmidt et al. | |
| 6,438,594 B1 | 8/2002 | Bowman-Amuah | |
| 6,450,407 B1 * | 9/2002 | Freeman et al. | 235/492 |
| 6,453,353 B1 | 9/2002 | Win et al. | |
| 6,460,141 B1 | 10/2002 | Olden | |
| 6,493,677 B1 | 12/2002 | von Rosen et al. | |
| 6,493,685 B1 | 12/2002 | Ensel et al. | |
| 6,496,855 B1 | 12/2002 | Hunt et al. | |
| 6,496,936 B1 | 12/2002 | French et al. | |
| 6,510,523 B1 | 1/2003 | Perlman et al. | |
| 6,526,404 B1 | 2/2003 | Slater et al. | |
| 6,532,284 B2 | 3/2003 | Walker et al. | |
| 6,535,855 B1 | 3/2003 | Cahill et al. | |
| 6,535,917 B1 | 3/2003 | Zamanzadeh et al. | |
| 6,535,980 B1 | 3/2003 | Kumar et al. | |
| 6,557,039 B1 | 4/2003 | Leong et al. | |
| 6,581,040 B1 | 6/2003 | Wright et al. | |
| 6,584,508 B1 | 6/2003 | Epstein et al. | |
| 6,609,106 B1 | 8/2003 | Robertson | |
| 6,609,113 B1 | 8/2003 | O'Leary et al. | |
| 6,609,125 B1 | 8/2003 | Layne et al. | |
| 6,609,198 B1 | 8/2003 | Wood et al. | |
| 6,618,579 B1 | 9/2003 | Smith et al. | |
| 6,618,806 B1 | 9/2003 | Brown et al. | |
| 6,623,415 B2 | 9/2003 | Gates et al. | |
| 6,687,222 B1 | 2/2004 | Albert et al. | |
| 6,718,482 B2 | 4/2004 | Sato et al. | |
| 6,718,535 B1 | 4/2004 | Underwood | |
| 6,725,269 B1 | 4/2004 | Megiddo | |
| 6,751,654 B2 | 6/2004 | Massarani et al. | |
| 6,754,833 B1 | 6/2004 | Black et al. | |
| 6,766,370 B2 | 7/2004 | Glommen et al. | |
| 6,769,605 B1 | 8/2004 | Magness | |
| 6,772,146 B2 | 8/2004 | Khemlani et al. | |
| 6,820,202 B1 | 11/2004 | Wheeler et al. | |
| 6,832,202 B1 | 12/2004 | Schuyler et al. | |
| 6,856,970 B1 | 2/2005 | Campbell et al. | |
| 6,892,231 B2 | 5/2005 | Jager | |
| 6,907,566 B1 | 7/2005 | McElfresh et al. | |
| 6,992,786 B1 | 1/2006 | Breding et al. | |
| 7,006,983 B1 * | 2/2006 | Packes et al. | 705/14 |
| 7,010,512 B1 | 3/2006 | Gillin et al. | |
| 7,080,036 B1 | 7/2006 | Drummond et al. | |
| 7,089,208 B1 | 8/2006 | Levchin et al. | |
| 7,089,503 B1 | 8/2006 | Bloomquist et al. | |
| 7,120,591 B1 | 10/2006 | Solomon | |
| 7,426,492 B1 * | 9/2008 | Bishop et al. | 705/39 |
| 2001/0012974 A1 | 8/2001 | Mahaffey | |
| 2001/0029464 A1 * | 10/2001 | Schweitzwer | 705/14 |
| 2001/0032184 A1 | 10/2001 | Tenembaum | |
| 2001/0047295 A1 | 11/2001 | Tenembaum | |
| 2001/0051917 A1 | 12/2001 | Bissonette et al. | |
| 2001/0054003 A1 | 12/2001 | Chien et al. | |
| 2002/0007313 A1 | 1/2002 | Mai et al. | |
| 2002/0007460 A1 | 1/2002 | Azuma | |
| 2002/0010599 A1 | 1/2002 | Levison | |
| 2002/0010668 A1 | 1/2002 | Travis et al. | |
| 2002/0018585 A1 | 2/2002 | Kim | |
| 2002/0019938 A1 | 2/2002 | Aarons | |
| 2002/0023108 A1 | 2/2002 | Daswani et al. | |
| 2002/0032613 A1 * | 3/2002 | Buettgenbach et al. | 705/26 |
| 2002/0032650 A1 * | 3/2002 | Hauser et al. | 705/40 |
| 2002/0059141 A1 | 5/2002 | Davies et al. | |
| 2002/0077978 A1 | 6/2002 | O'Leary et al. | |
| 2002/0099652 A1 * | 7/2002 | Herzen et al. | 705/39 |
| 2002/0099826 A1 | 7/2002 | Summers et al. | |
| 2002/0104006 A1 | 8/2002 | Boate et al. | |
| 2002/0104017 A1 | 8/2002 | Stefan | |
| 2002/0107788 A1 | 8/2002 | Cunningham | |
| 2002/0116271 A1 * | 8/2002 | Mankoff | 705/14 |
| 2002/0152163 A1 * | 10/2002 | Bezos et al. | 705/40 |
| 2002/0165949 A1 | 11/2002 | Na | |
| 2002/0174010 A1 * | 11/2002 | Rice, III | 705/14 |
| 2002/0184507 A1 | 12/2002 | Makower et al. | |
| 2002/0188869 A1 | 12/2002 | Patrick | |
| 2002/0191548 A1 | 12/2002 | Ylonen et al. | |
| 2002/0198806 A1 | 12/2002 | Blagg et al. | |
| 2003/0001888 A1 | 1/2003 | Power | |
| 2003/0018915 A1 | 1/2003 | Stoll | |
| 2003/0023880 A1 | 1/2003 | Edward et al. | |
| 2003/0037131 A1 | 2/2003 | Verma | |

(56) References Cited

U.S. PATENT DOCUMENTS

| | | | |
|---|---|---|---|
| 2003/0037142 | A1 | 2/2003 | Munger et al. |
| 2003/0040995 | A1 | 2/2003 | Daddario et al. |
| 2003/0046587 | A1 | 3/2003 | Bheemarasetti et al. |
| 2003/0046589 | A1 | 3/2003 | Gregg |
| 2003/0051026 | A1 | 3/2003 | Carter et al. |
| 2003/0070069 | A1 | 4/2003 | Belapurkar et al. |
| 2003/0070084 | A1 | 4/2003 | Satomaa et al. |
| 2003/0074580 | A1 | 4/2003 | Knouse et al. |
| 2003/0079147 | A1 | 4/2003 | Hsieh et al. |
| 2003/0084345 | A1 | 5/2003 | Bjornestad et al. |
| 2003/0084647 | A1 | 5/2003 | Smith et al. |
| 2003/0088552 | A1 | 5/2003 | Bennett et al. |
| 2003/0105981 | A1 | 6/2003 | Miller et al. |
| 2003/0110399 | A1 | 6/2003 | Rail |
| 2003/0115160 | A1 | 6/2003 | Nowlin et al. |
| 2003/0119642 | A1 | 6/2003 | Gates et al. |
| 2003/0140004 | A1* | 7/2003 | O'Leary et al. ............... 705/39 |
| 2003/0154403 | A1 | 8/2003 | Keinsley et al. |
| 2003/0159072 | A1 | 8/2003 | Bellinger et al. |
| 2003/0163733 | A1 | 8/2003 | Barriga-Caceres et al. |
| 2003/0177067 | A1 | 9/2003 | Cowell et al. |
| 2003/0191549 | A1 | 10/2003 | Otsuka et al. |
| 2004/0031856 | A1* | 2/2004 | Atsmon et al. ............... 235/492 |
| 2004/0153378 | A1* | 8/2004 | Perkowski ...................... 705/27 |
| 2004/0215514 | A1* | 10/2004 | Quinlan et al. ................ 705/14 |
| 2004/0254891 | A1* | 12/2004 | Blinn et al. .................... 705/67 |
| 2005/0091126 | A1* | 4/2005 | Junger ............................ 705/26 |

FOREIGN PATENT DOCUMENTS

| | | | |
|---|---|---|---|
| EP | 0884877 | | 12/1998 |
| EP | 0917119 | | 5/1999 |
| EP | 1014318 | A2 | 6/2000 |
| EP | 1022664 | | 7/2000 |
| JP | H10187467 | | 7/1998 |
| JP | 2001134672 | | 5/2001 |
| JP | 2005-242976 | | 9/2005 |
| WO | WO 97/43736 | | 11/1997 |
| WO | WO 99/40507 | | 8/1999 |
| WO | WO 99/52051 | | 10/1999 |
| WO | WO 00/68858 | | 11/2000 |
| WO | WO 01/18656 | | 3/2001 |
| WO | WO 01/35355 | | 5/2001 |
| WO | WO 01/43084 | | 6/2001 |
| WO | WO 02/17082 | | 2/2002 |
| WO | WO 2004/079603 | | 9/2004 |

OTHER PUBLICATIONS

Epper, A Player Goes After Big Bucks in Cyberspace, American Banker, vol. 160, No. 86, ISSN: 0002-7561, May 5, 1995, p. 17.
Berry et al., A Potent New Tool for Selling Database, Business Week, Sep. 5, 1994, pp. 56-62.
Berry et al., A potent new tool for selling databse, Business Week, Cover Story, Sep. 5, 1994, pp. 56-62.
Applets, java.sun.com, May 21, 1999.
Associates National Bank (DE) Credit Card, The Associates, www.theassociates.com/consumer/credit_cards/main.html , Apr. 6, 1999, 6 pages.
At Your Request, www.wingspanbank.com, Sep. 28, 1999.
Anonymous, Aversion Therapy: Banks Overcoming Fear of the 'Net to Develop Safe Internet-based Payment System w/ Netscape Communicator, Network World, ISSN: 0887-7661, Dec. 12, 1994.
JAVA, Banking on JAVA(TM) Technology, java.sun.com, May 21, 1999.
Bechtel Construction Operations Incorporated Standardizes on Primavera's Expedition Contract Management Software, Business Wire, Jul. 27, 1999.
Anonymous, CORBA Overview, arch2.htm at pent21.infosys.tuwien.ac.at, May 25, 1999.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Bank, Cash, Check,Charge—What's Next?, Seattle Times, Mar. 6, 1995.
Consortium Created to Manage Common Electronic Purse Specifications, http://www.visa.com/av/news/PRmisc051199.vhtml, printed Feb. 23, 2001.
Civitello Jr., Construction Operations Manual of Policies and Procedures, Third Edition, 2000.
Marchman, Construction Scheduling with Primavera Project Planner, May 25, 1999.
Chester, Cross-platform integration with XML and SOAP, IT PTO Sep.-Oct. 2001.
Mitchell, Cyberspace: Crafting Software . . . , Business Week, Feb. 27, 1999, pp. 78-86.
Friedman, Dictionary of Business Terms, Barron's Third Edition, Copyright 2000.
Strassel, Dutch Software Concern Experiments with Electronic 'Cash' in Cyberspace, The Wall Street Journal, Apr. 17, 1995.
Post, E-Cash: Can't Live With It, Can't Live Without It, The American Lawyer, Mar. 1, 1995, pp. 116-117.
Thomas, Enterprise Javabeans(TM) Technology: Server Component Model for the Java(TM) platform, java.sun.com, May 2, 1999.
Maize, Fannie Mae on the Web, Doucment ID: 52079, May 8, 1995.
FreeMarkets, printed on Apr. 26, 1999.
The Gale Group, G&D America's Multi-application Smart Card Selected for Combined Payroll and 'Virtual Banking' Program in Mexico, Business Wire, Apr. 24, 1998, p. 241047.
Getting Smart with Java: Sun Micro Says American Express to Use Java for Smart Card, ABCNews.com, printed on Jun. 6, 2000.
Getting Started: Specific GE TPN Post Service Use Guidelines, printed on Apr. 26, 1999.
Harris, Harris InfoSource, printed on Apr. 26, 1999.
Knowles, Improved Internet Security Enabling On-Line Commerce, PCWeek, vol. 12, No. 11, ISSN: 0740-1604, Mar. 20, 1995.
Meredith, Internet bank moves closer to virtual reality, USA Today, May 5, 1995.
JAVA, JAVA (TM) Technology in the Real World, java.sun.com, May 21, 1999.
JAVA, JAVA(TM) Remote Method Invocation (RMI) Interface, java.sun.com, May 32, 1999.
JAVA, JAVA(TM) Servlet API, java.sun.com, May 21, 1999.
OMG, Library, www.omg.com, May 25, 1999.
Method of Protecting Data on A Personal Computer, IBM Corporation, TDB 11-85, Order 85A 62426, Nov. 1, 1995, p. 2530.
Clark, Microsoft, Visa to Jointly Develop PC Electronic-Shopping Software, The Wall Street Journal, Nov. 9, 1994, Nov. 9, 1994 WSJ B9.
Sirbu, et al, NetBill: An Internet Commerce System Optimized for Network Delivered Services, printed on Feb. 27, 1995.
Mitchell, Netlink Goes After an Unbanked Niche, Card Technology, ISSN: 1093-1279, Sep. 1999, p. 22.
Barnham, Network Brings Together Producers and Companies, Document ID: 17347.
Houlder, OFT Gives the Individual Top Priority: Report Calls for Deregulation of Business Lending, Document ID: 91716, Jun. 8, 1994.
Omware, Inc., Web Pages, Feb. 2000, Retrieved from Archive.org, Nov. 28, 2005.
Anonymous, Overview of CORBA, May 25, 1999.
Harris, Planning Using Primavera Project Planner P3 Version 3.0, User Guide, Copyright 1999 by Eastwood Harry Pty Ltd., 1999.
Johnston, Pondering Passport: Do You Trust Microsoft with Your Data?, www.pcworld.com/resource/printable/article/0.aid,63244,00.asp, Sep. 24, 2001.
Primavera Systems, Inc.—How the World Manages Projects, Expedition Contract Control Software, www.primavera.com, Jun. 23, 2005.
Primavera and PurchasePro.com to Create E-Commerce Marketplace for Construction Industry, Primavera Ships P3, version 3.0, www.purchasepro.com/, Sep. 21, 1999, pp. 1-3.
Product Data Integration Technologies, Inc., Step Integratin Authors, printed on Apr. 26, 1999.

(56) References Cited

OTHER PUBLICATIONS

Resource Center: Consolidated Edison Selects GE TPN Post, printed Apr. 26, 1999.
Kormann, Risks of the Passport Single Signon Protocol, Computer Networks, Elsevier Science Press, vol. 33, Sep. 20, 2003, pp. 51-58.
SBA: Pro-Net, U.S. Small Business Administration Procurement Marketing and Access Network, Last Modified: Apr. 1, 1999.
Jepsen, SOAP Cleans up interoperability problems on the web, IT PTO, Jan./Feb. 2001.
Safe Single-Sign-On Protocol with Minimal Password Exposure No Decryption and Technology Adaptivity, IBM Corporation, TDB 03-95, Order 95A, Mar. 1, 1995, pp. 245-248.
Sun Microsystems, Inc., Schema for Representing CORBA Objects in an LDAP directory, May 21, 1999, pp. 1-9.
Jakobsson et al., Secure and lightweight advertising on the web, Computer Networks, 31 (1999) 1101-1109.
Servlet/Applet/HTML Authentication Process with Single Sign-On, IBM Corporation, IBM Order: 00A6004, Jan. 1, 2000.
Shibata, Seventh International Conference on Parallel and Distributed Systems: Workshops, IEEE Computer Society, Jul. 4-7, 2000.
Siebel, Siebel: Ensuring Customer Success, www.siebel.com, Nov. 17, 1999.
SmartAxis, How it works, http://www.smartaxis.co.uk/seller/howitworks.html, printed on Feb. 23, 2001.
Thomas Publishing Company, SoluSource: For Engineers by Engineers, Thomas Publishing Company, Apr. 26, 1999.
JAVA, Staying in Touch with JNDI, java.sun.com, May 21, 1999.
Summary of The At Your Request Architecture, First USA Bank Confidential and Proprietary, Apr. 2, 1999, pp. 1-8.
Temporary Global Passwords, IBM Corporation, IBM TDB v36, n3, 03-93, Order 93A 60636, Mar. 1, 1993, pp. 451-454.
JAVA, The JDBC(TM) Data Access API, java.sun.com, May 21, 1999.
The check is in the email, Information Today, vol. 12, No. 3, ISSN: 8755-6286, 03/01995.
Thomas Publishing Company, ThomasNet, Apr. 26, 1999.
Ritz, Total Construction Project Management, McGraw-Hill, 1994.
Hewlett-Packard Company, Understanding Product Data Management, Hewlett-Packard Company.
Welcome to MUSE, Apr. 26, 1999.
OMG, Welcome to OMG's CORBA for Beginners Page!, www.omg.co, May 25, 1999.
OMG, What is CORBA?, www.omg.com, May 25, 1999.
Fujimura et al., XML Voucher: Generic Voucher Language, Feb. 2003.
eCharge, eCharge Corporation, www.echarge.com, Dec. 3, 1999.
Larsen, Amy, Internet goes to Work for Builders, InterWeek, Nov. 16, 1998, Issue 741.
Mary C. Lacity, et al., Mary C. Lacity, et al., The Information Systems Outsourcing Bandwagon, Sloan Management Review, vol. 35, No. 1, Fall 1993, p. 73-86.
Point for Windows Version 3.x Interface Marketing Guide.pdf.
Mosig, Richard, Software Review: the Construction Project Manager Cost Engineering, Jan. 1996, vol. 38, No. 1, pp. 7-8.
Hernandez, Tomas et al., Software Solutions Building Design & Construction, Nov. 1999, vol. 40, No. 11, pp. 38-40.

\* cited by examiner

Fig 11

SENDER – IDENTIFICATION INFORMATION

| | |
|---|---|
| First Name | 108 |
| Middle Name | 110 |
| Last Name | 112 |
| Suffix | 114 (optional) |
| E-Mail Address | 116 |
| Login Name | 118 |
| Password | 120 |
| Password Hint | 122 (optional) |

BANK – CUSTOMER INFORMATION

| | |
|---|---|
| Bank Card Number | 128 |
| PIN | 130 |
| Social Security Number | 132 |

BANK – NONCUSTOMER INFORMATION

| | |
|---|---|
| Social Security Number | 142 |
| City | 144 |
| State | 146 |
| Zip Code | 148 |
| Driver's Lic/State I.D. Number | 150 |
| Driver's License State | 152 |
| Date of Birth | 154 |

SEND – TRANSACTION INFORMATION

| | |
|---|---|
| Receiver's Name | 160 |
| Receiver's E-Mail Address | 162 |
| Challenge Question | 164 |
| Expected Challenge Response | 166 |
| Amount of Money Sending | 170 |
| E-Mail Subject | 172 |
| E-Mail Message | 174 (optional) |

CREDIT CARD INFORMATION

| Credit Card Account Number | 178 |
|---|---|
| Expiration Date | 180 |
| Card Verification Value (CVV) | 182 |
| First Name | 184 |
| Last Name | 186 |
| Street Address | 188 |
| City | 190 |
| State | 192 |
| Zip Code | 194 |

176

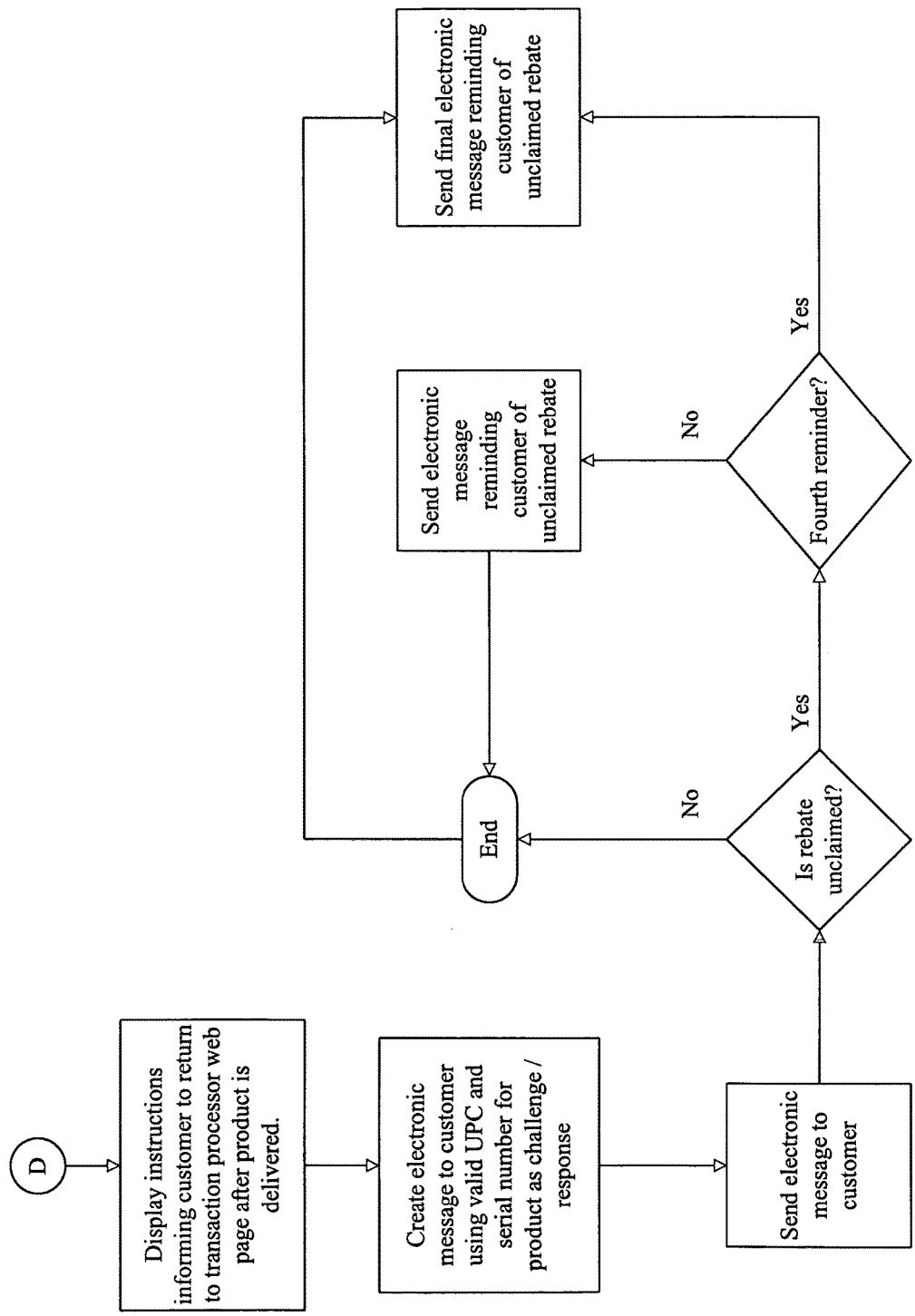

METHOD AND APPARATUS FOR SENDING A REBATE VIA ELECTRONIC MAIL OVER THE INTERNET

BACKGROUND OF THE INVENTION

The present invention generally relates to a system and method for sending money via electronic mail and, more particularly, to a system and method for sending money via electronic mail over a computer network wherein a sender identifies a withdraw account such as a checking account and/or a credit card account and a receiver identifies a deposit account such as a checking account or credit card account.

The Internet is a public network of computers which is, in simplified fashion, a web of autonomous computers and computer servers ("ACCS") linked to data switches or routers and connected together. The ACCS are typically owned and operated by Internet Service Providers ("ISP") such as PSI, UUNET, MCI, SPRINT, etc. The ACCS are link by telecommunication lines to form the Internet. Large data sources such as universities, governments, and corporations, collect and market information through their own Internet servers connected to the Internet. Users typically access the Internet using an Internet access device such as a personal computer or WEB TV which are connected to an ISP via a telecommunications line. The ISP typically provides numerous services for its users such as, for example, electronic messaging or mail ("e-mail") and access to the World Wide Web ("WWW").

Each resource (e.g., computer or computer server) is identified by a unique Uniform Resource Locator ("URL"). Computer servers (typically called "Web servers" or "Web sites"), store information on graphical pages called Web pages. To view specific information, a user specifies the URL for the Web page in a request (e.g., a HyperText Transfer Protocol ("HTTP") request). The request is forwarded to the Web server that supports the Web page and the Web server sends the Web page of information to the user's computer. The user's computer displays the Web page, typically using a browser which is a special-purpose application program which requests and displays Web pages.

Web pages are typically defined using HyperText Markup Language ("HTML"). HTML provides a standard set of tags that define how a Web page displays various text, graphics, controls, and other features. When the user requests the browser to display a Web page, the browser sends a request to the Web server to transfer to the user's computer an HTML document that defines the Web page. When the requested HTML document is received, by the user's computer, the browser displays the Web page as defined by the HTML document. The HTML document may contain URL's of other Web pages available on that Web server or other Web servers.

The Internet is considered to have enormous potential as means of communication, source of information, and marketplace for products. It is now possible to communicate with virtually everyone with a computer, to obtain information about virtually everything, and to purchase virtually anything via the Internet. Although the Internet has enormous potential, use of the Internet may not be developing at a rate it can and should develop. One reason for this depressed development is the difficulty to send money over the Internet. A user cannot send cash or a check over the Internet and sending a credit card number via the Internet is only an option if the sender has a credit card and the recipient has a credit card merchant account as required by credit card companies. Additionally, the alternative of sending cash or a check via a physical delivery service is slow and burdensome and is relatively expensive to obtain a shorter delivery time. Accordingly, there is a need for an improved system and method of sending money via the Internet.

Product manufacturers and retailers often provide rebates to customers for purchasing products. Typically, such rebates require warranty cards or rebate coupons to be mailed to the manufacturer. Upon processing the cards or coupons, the manufacturer mails a check for the rebate amount to the purchaser. The present methods of processing rebate requests are inefficient and time consuming. Accordingly, there is a need for an improved method for requesting and delivering rebates to consumers.

RELATED APPLICATIONS

The present application is a Continuation-In-Part of U.S. patent application Ser. No. 09/448,738, filed Nov. 24, 1999.

SUMMARY OF THE INVENTION

The present invention provides a system and method of initiating a request for a rebate and for sending funds representing a rebate over a computer network. According to one aspect of the present invention, a method for initiating a funds transfer representing a rebate associated with a product purchase is disclosed. The method includes the step of receiving certain data over the computer network from a rebate processor. The received data includes a request to initiate a funds transfer associated with the product purchase, a recipient identifier identifying the recipient, and amount data representing an amount of money to be rebated. The method also includes the step of generating an electronic message including embedded funds transfer data. In addition, the method further includes the step of sending the electronic message to the recipient over the computer network using the recipient identifier to inform the recipient that the rebate request has been processed.

According to another aspect of the present invention, the present invention also includes a method for delivering a rebate and completing a funds transfer associated with a product purchase. The method includes the step of receiving data over a computer network from the recipient. The received data includes a request to receive a rebate associated with a product purchase, and a transaction identifier identifying the funds transfer associated with the product purchase. The method also includes the step of transferring funds to a deposit account associated with the recipient. Further, the method includes the step of sending a confirmation of the funds transfer to the rebate processor and the recipient over the computer network.

BRIEF DESCRIPTION OF THE DRAWINGS

These and further features of the present invention will be apparent with reference to the following description and drawing, wherein:

FIG. 11 is a block diagram showing typical sender-identification information used with the money-mailing system and method of FIGS. 1 and 2;

FIG. 12 is a block diagram showing typical bank-customer information used with the money-mailing system and method of FIGS. 1 and 2;

FIG. 13 is a block diagram showing typical bank-non-customer information used with the money-mailing system and method of FIGS. 1 and 2;

FIG. 14 is a block diagram showing typical send-transaction information used with the money-mailing system and method of FIGS. 1 and 2;

FIG. 15 is a block diagram showing typical credit-card information used with the money-mailing system and method of FIGS. 1 and 2;

FIGS. 19A-19E are flow charts illustrating various processes comprising the method for delivering a rebate and transferring associated funds, generally depicted in FIG. 17;

FIGS. 22A-22B are flow charts illustrating various processes comprising the method of initiating a funds transfer of a rebate, generally depicted in FIG. 21.

DETAILED DESCRIPTION OF THE DRAWINGS

Figure 1:
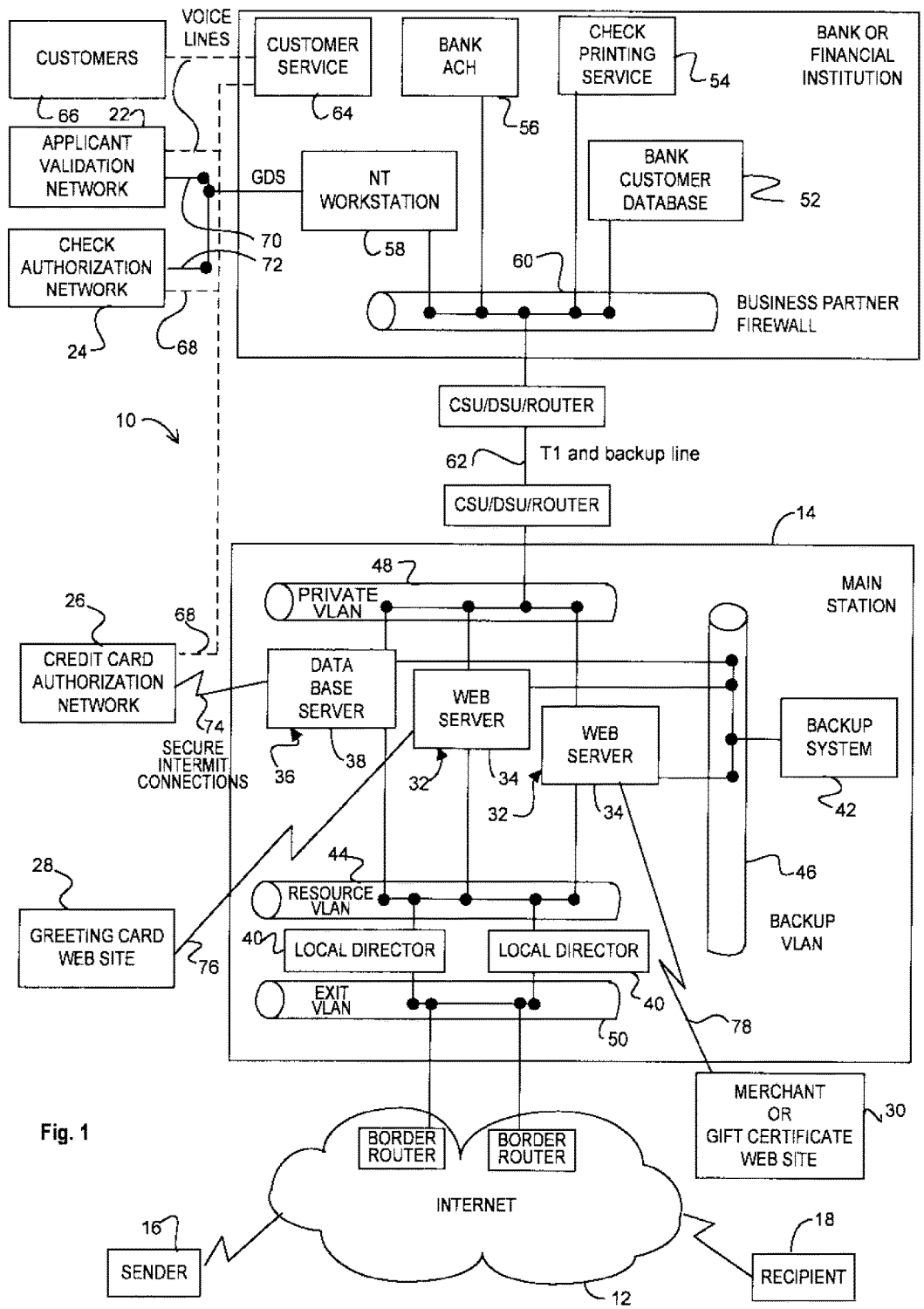
FIG. 1 is a diagrammatic view of a system for sending money via electronic mail over a computer network according to the present invention.
Figure 2:
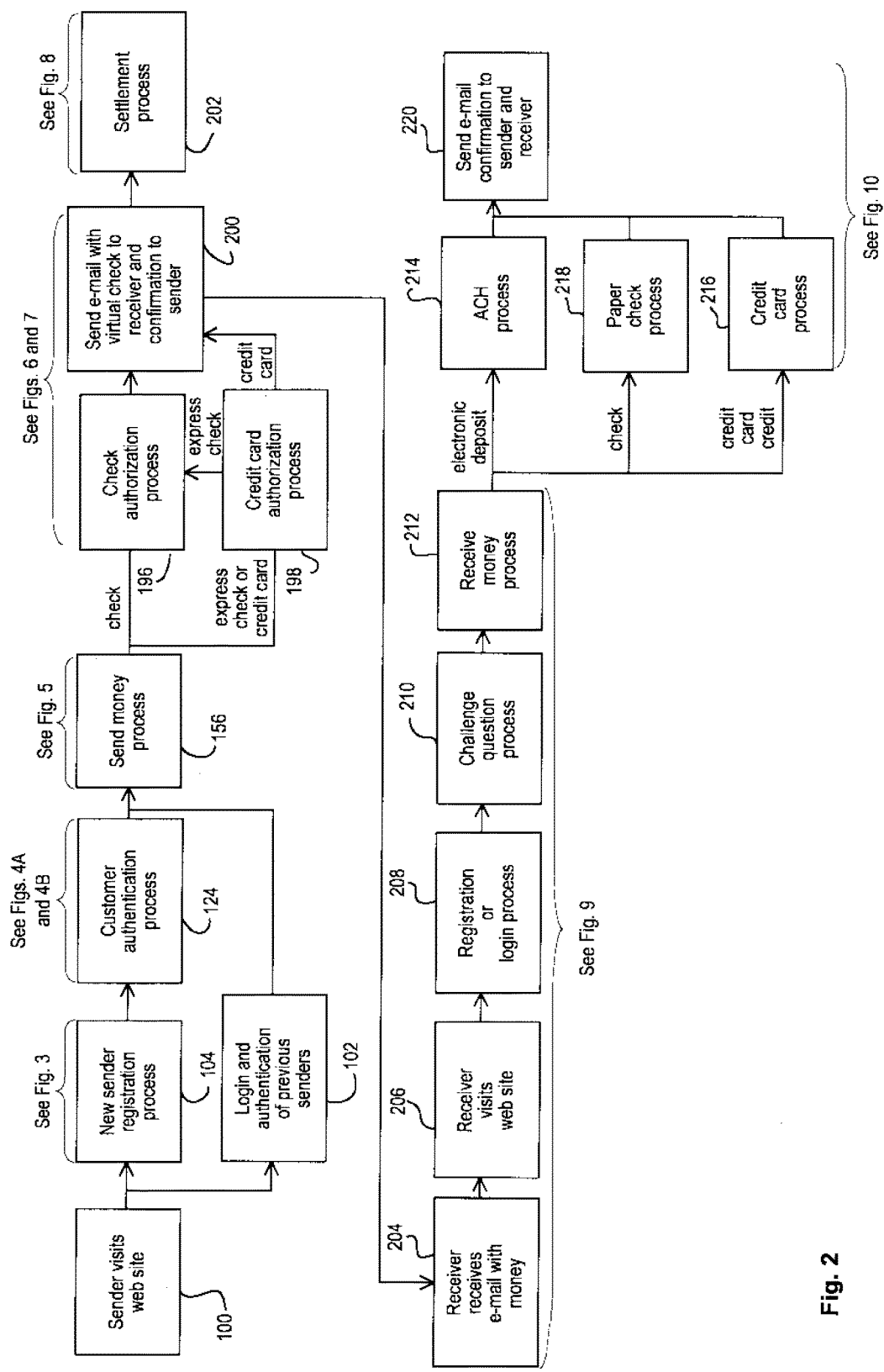
FIG. 2 is a flow chart diagrammatically illustrating a method for sending money via electronic mail over a computer network using the money-mailing system of FIG. 1.

FIG. 1 illustrates a block diagram of a system 10 for sending money via electronic messaging or mail ("e-mail") over a computer network such as the Internet 12 according to a preferred embodiment of the present invention. It is noted that while the money-mailing system 10 of the present invention is particularly useful with the Internet 12 and is shown and described using the Internet 12, the money-mailing system 10 can be used in conjunction with other communications systems or networks, with or without a central management system, within the scope of the present invention such as, for example, centrally managed networks (e.g., America Online, Prodigy, etc.) local Area networks, wide area networks, point-to-point dial-up connections, and the like.

The illustrated money-mailing system 10 includes a main station 14 which is accessed by senders and receivers 16, 18 via the Internet 12 to send money e-mail, a bank 20 for performing financial transactions of the money-mailing system 10, an applicant validation network 22 for authenticating new customers, a check authorization network 24 for authorizing ACH transactions, a credit card authorization network 26 for authorizing credit card transactions, a greeting card web site 28 for including an electronic greeting card with e-mail when desired by the customer, and a merchant or gift certificate web site 30 for providing electronic gift certificates and/or goods for electronic gift certificates. The embodiments and methods for initiating and receiving greeting cards with "attached" funds are described in more detail below with reference to FIGS. 17-20.

The main station 14 of the money-mailing system 10 preferably has at least one web server 32 for providing a web site 34, at least one database server 36 for providing a database 38 to process and store information, at least one local director 40 for connecting separate VLANs, and a backup system 42 for providing backup storage of data. The illustrated main station 14 includes two web servers 32 but any number of web servers 32 can be utilized to meet the required simultaneous use of the money-mailing system 10. Suitable web servers 32 are believed to be available from the Compaq Computer Company of Houston, Tex. The illustrated main station 14 includes one database server 36 but any number of database servers 36 can be utilized to meet the required simultaneous use of the money-mailing system 10. Suitable database servers 36 are believed to be available from Sun Microsystems, Inc. of Palo Alto, Calif. It is noted that the database server 36 is preferably separate from the web servers 32 for added security but all of the servers 32, 36 can be combined if desired. The illustrated servers 32, 36 are connected via a resource VLAN 44, a backup VLAN 46, and a private VLAN 48. The resource VLAN 44 is connected to an exit VLAN 50 through at least one local director 40. The illustrated main station 14 includes two local directors 40 but any number of local directors 40 can be utilized to meet the simultaneous use demands of the money-mailing system 10. Suitable local directors are available from Cisco Systems, Inc. of San Jose, Calif. Customers, such as the illustrated sender and receiver 16, 18, access the exit VLAN 50 via the Internet 12 in a conventional manner. Suitable firewalls are created and maintained by a suitable provider such as, for example, GTE Internetworking between the customers 16, 18 and the components of the main station 14. While a single sender 16 and a single receiver 18 are shown in FIG. 1, it is understood that many senders and receivers 16, 18 can access the money-mailing system 10 via the Internet 12 at the same time. The backup system 42 is in communication with the servers 32, 36 via the backup VLAN 46. A suitable backup system 42 is available from Legato Systems, Inc. of Palo Alto, Calif. The servers 32, 36 are in communication with the bank 20 through the private VLAN 48 as described in more detail hereinbelow.

The bank 20 includes a customer database 52 for storing data regarding customer accounts, a check printing service 54, such as what can be provided by the EDS Corporation, for processing and mailing paper checks, an ACH group 56 for processing ACH transactions, and a computer workstation 58 for communicating with various business partners. The bank components 52, 54, 56, 58 are in communication via a VLAN 60 and separated by a firewall created and maintained by a suitable provider such as, for example, GTE Internetworking. The bank VLAN 60 is in communication with the private VLAN 48 of the main station 14 via a primary telecommunications line 62 and preferably at least one backup telecommunications line. The primary telecommunications line 62 is preferably a "wide band" line such as a T1 line or the like. The illustrated bank 20 also includes a customer service department 64 which is in communication with customers 66 and business partners 22, 24, 26 via voice telecommunications lines 68. The customer service department can alternatively be an external provider which can be in communications with customers and business partners via voice and data telecommunications lines and/or the Internet. It is noted that the term bank 20 as used in this specification and claims includes traditional banks as well as savings and loans, credit unions, and other such financial institutions which provide necessary banking functions such as ACH transactions.

The illustrated applicant validation network 22 is a business partner providing the service of authenticating new customers by providing fraud checks as known in the industry. The applicant validation network 22 is preferably a debit scoring system such as ChexSystems of the Deluxe Corporation of Shoreview, Minn. The illustrated applicant verification network 22 is in direct communication with the bank workstation 58 via a telecommunications line 70 but alternatively can be in direct communication with the servers 32, 36 via a secure Internet connection.

The illustrated check authorization network 24 is a business partner providing the service of authorizing ACH transactions. The check authentication network 24 is preferably a clearinghouse for ACH transactions such as eFunds of the Deluxe Corporation of Shoreview, Minn. The illustrated check authorization network 24 is in direct communication with the bank workstation 58 via a telecommunications line 72 but alternatively can be in direct communication with the servers 32, 36 via a secure Internet connection.

The illustrated credit card authorization network 26 is a business partner providing the service of authorizing credit card transactions. The credit card authorization network 26 is preferably an Internet based clearing house for credit card authorization such as CyberSource Corporation of San Jose, Calif., but can alternatively can be the credit card companies such as, for example, VISA and MASTERCARD. The illustrated credit card authorization network 26 is in direct communication with the database server 36 via a secure Internet connection.

The greeting card web site 28 is a business partner providing the service of including an electronic greeting card with e-mail when desired by the customer. The illustrated greeting card web site 28 is in direct communication with the web server 32 via a secure internet connection 76 but alternatively can be in direct communication with the web database 36.

The merchant or gift certificate web site 30 is a business partner providing a service such as providing goods or services to be purchased with the money or providing electronic gift certificates with the money for later purchase of goods or services. The illustrated merchant or gift certificate web site 30 is in direct communication with the web server 32 via a secure internet connection 78 but alternatively can be in direct communication with the web database 36.

E-Mail Embodiment

FIGS. 2-10 illustrate a preferred method according to the present invention for sending money via e-mail over a computer network such as the Internet 12 using the money-mailing system 10 of FIG. 1. It is noted that while the servers 32, 36 and any other processors of the money-mailing system 10 are preferably provided with programming code adapted to perform the method described hereinbelow, there are many variations of the money-mailing method within the scope of the present invention. A first stage 100 of the money-mailing method is a web-site visiting process. The sender 16 visits the web site 34 of the money-mailing system 10 via the Internet 12. The web server 32 displays a web site or home page which provides information about the money-mailing system 10. When the sender 16 clicks on a "send money" button via a mouse, the sender 16 is requested to identify whether they are a first time sender using the money-mailing system 10. For first time senders, the money-mailing system 10 proceeds to a third stage 104 as described in detail hereinbelow. For previous senders, the money-mailing system 10 proceeds to a second stage 102.

Figure 3:
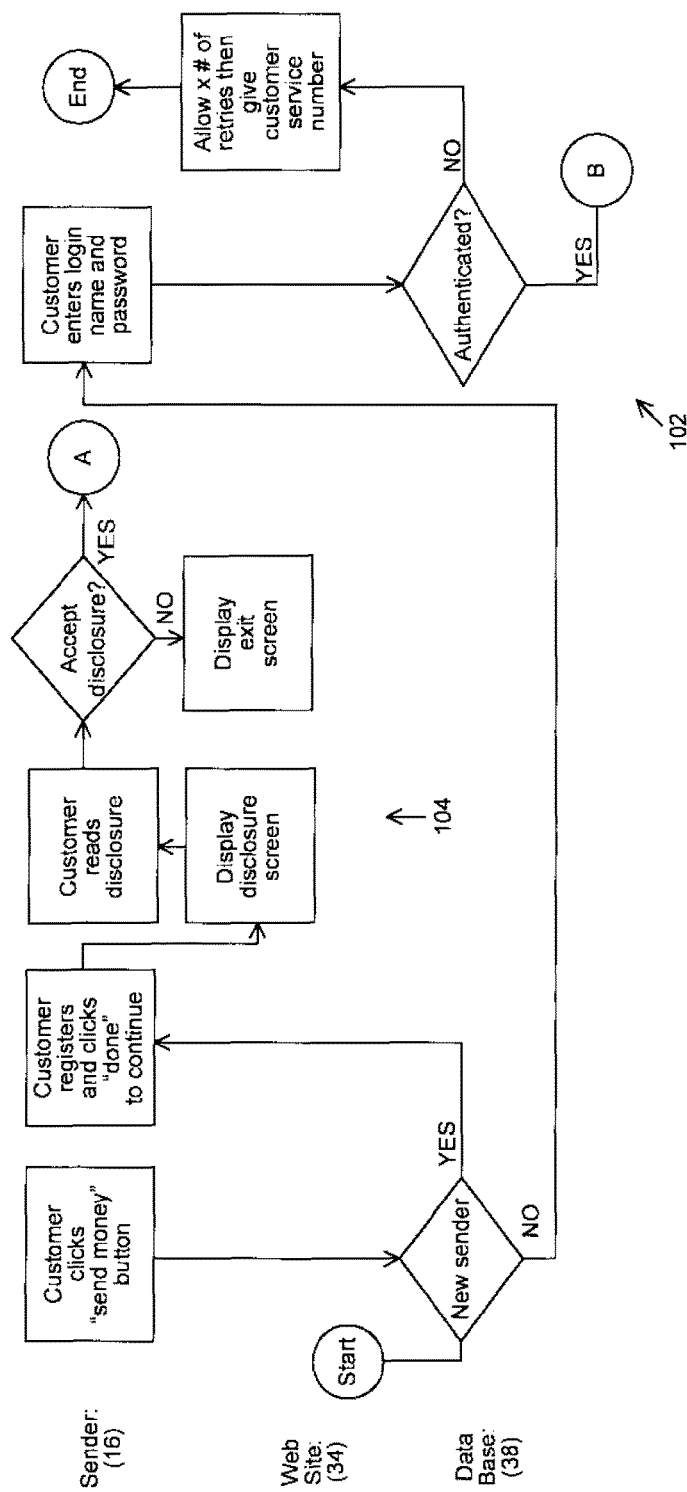
FIG. 3 is a flow chart diagrammatically illustrating a registration process for new senders and logging-in and authenticating process for previous senders of the money-mailing method of FIG. 2.

The second stage 102 of the money-mailing system 10 is a logging-in and authenticating process for senders 16 who have previously sent money using the money-mailing system 10. As best shown in FIG. 3, if the sender 16 is not a first time sender, they are asked to enter their login name and their password which they previously provided as described in detail hereinbelow. The money-mailing system 10 authenticates the login name and the password input by the sender 16 to verify that the sender 16 is a customer in "good standing". If the login name and password cannot be authenticated, the sender 16 is preferably given at least one additional try to input the information. If the login name and password are not authenticated within a predetermined number of retries, the web site 34 displays an "exit page" which preferably provides a phone number for the customer service department 64. If the sender 16 is authenticated to be a customer "not in good standing", the web site 34 displays an "exit page" which preferably provides a phone number of the customer service department 64. If the sender 16 is authenticated to be a customer in "good standing", the sender 16 is given the option of viewing a list of previous transactions they made through the money-mailing system 10, canceling a previous transaction if not beyond a predetermined point, or beginning a new transaction. The list of previous transactions preferably includes the status of each transaction, who the e-mail was sent to, how much money was sent, when a check was posted, when a check was cashed etc. The money-mailing system 10 then proceeds to a fifth stage 156 as described in detail hereinafter.

The third stage 104 of the money-mailing system 10 is a registration process for senders 16 who have not previously sent money using the money-mailing system 10. When the sender 16 is a first time sender, the web site 34 displays a "new sender page" and requests the sender 16 to register as a sender 16 by providing sender-identification information 106. FIG. 11 illustrates typical sender-identification information 106 such as, for example, first name 108, middle name 110, last name 112, suffix 114, network or e-mail address 116, login name 118, password 120, and password hint 122. Once the requested sender-identification information 106 is input, the sender clicks on a "done" button via a mouse to continue. The web site 34 displays a "disclosure page" showing a disclosure regarding the money-mailing system 10 and requests the sender 16 to read the disclosure and indicate whether they accept the terms of the disclosure. If the sender 16 does not accept the terms of the disclosure, the web site 34 displays the "exit page". If the sender 16 accepts the terms of the disclosure, the money-mailing system 10 proceeds to a fourth stage 124.

The fourth stage 124 of the money-mailing system 10 is a customer authentication process. Customer authentication is performed to identify customers which will most likely have check or credit card transactions denied prior to requesting a check or credit card authorization. The sender-identification information 106 which was provided by the sender 16 is authenticated to approve or deny the sender 16 as a customer in "good standing". Preferably the sender's e-mail address 116 is validated prior to beginning the customer authentication process 124. The e-mail address 116 can be validated by simply sending an e-mail to the address, without making the sender 16 leave the web site 34, while the customer authentication process 124 proceeds in parallel. If the e-mail "bounces", i.e. a message is returned that the address cannot be located, the sender 16 is still at the web site 3 to enable corrective action.

Figure 4A:
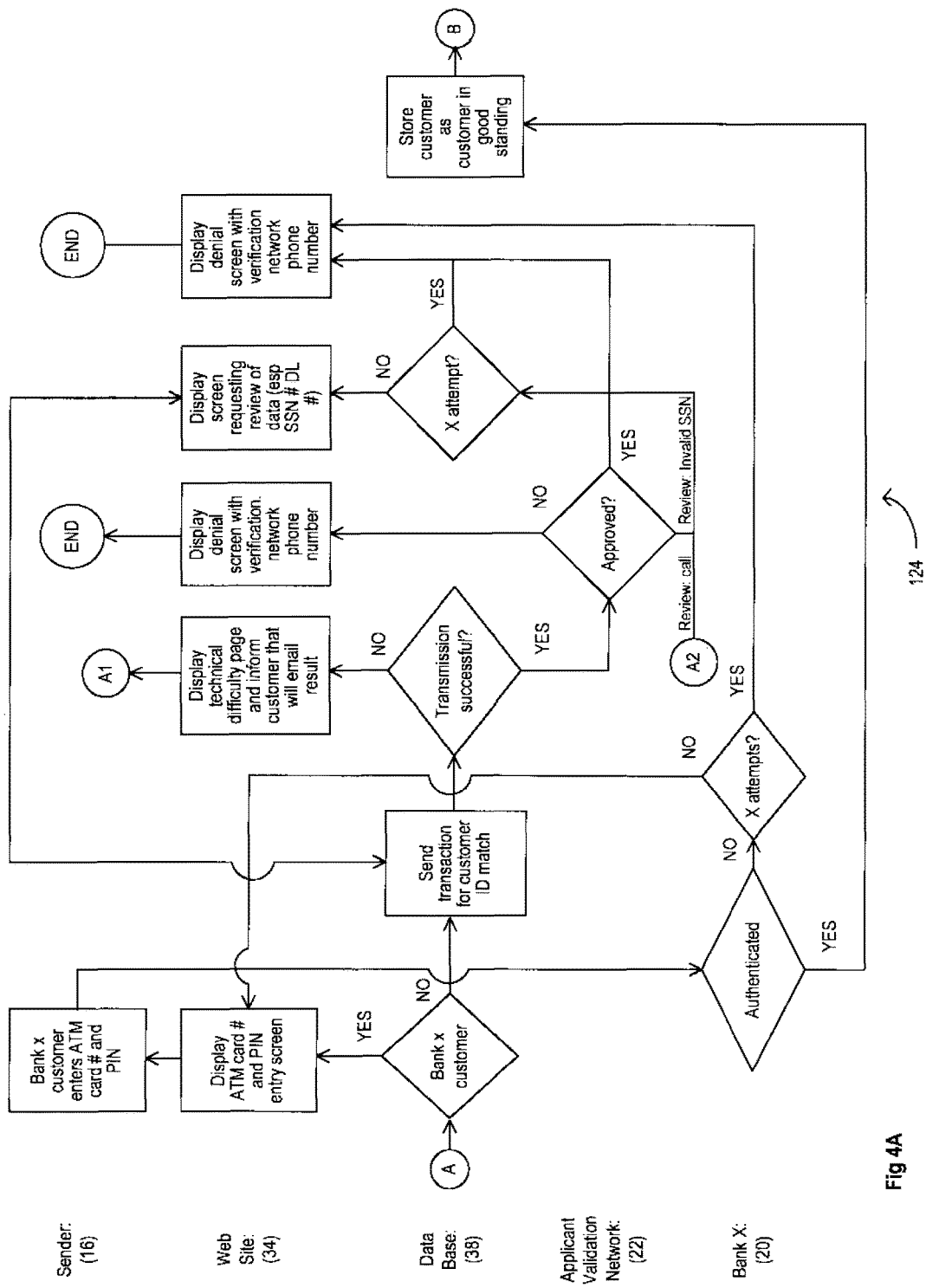
FIGS. 4A and 4B are flow charts diagrammatically illustrating a new customer authentication process of the money-mailing method of FIG. 2.
Figure 4B:
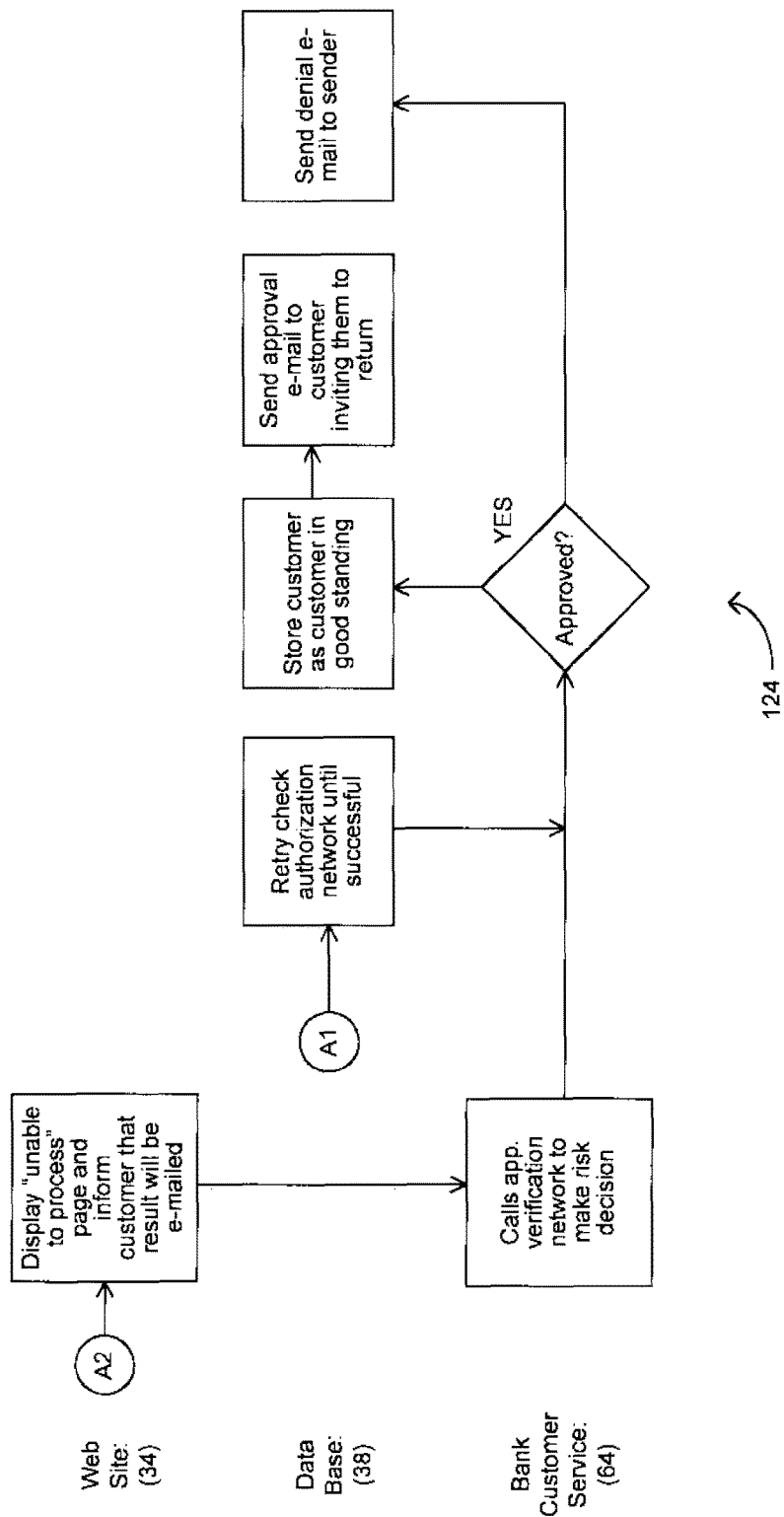

As best shown in FIGS. 4A and 4B, the customer authentication process 124 preferably begins by inquiring whether the sender 16 is a current customer of the money-mailing-system bank 20. If the sender 16 is a customer of the money-mailing-system bank 20, the web site 34 displays a "bank-customer information page" and requests the sender 16 to input bank-customer information 126. FIG. 12 illustrates bank-customer information 126 such as, for example, an ATM card number 128, PIN 130, and social security number 132. Once the bank-customer information 126 is input, the sender 16 clicks a "done" button via a mouse to continue and the money-mailing system 10 begins to authenticate the bank-customer information 126 provided by the sender 16. If the bank-customer information 126 cannot be authenticated, the sender 16 is preferably given at least one additional try to input the bank-customer information 126. If the bank-customer information 126 fails to be authenticated in a predetermined number of retries, the web site 34 displays the "exit page" which preferably provides a phone number for the customer service department 64. If the bank-customer information 126 is authenticated, the sender 16 is stored in the data base 38 as a customer in "good standing".

If the sender 16 is not a current customer of the money-mailing-system bank 20, the web site displays a "bank-noncustomer information page" and requests the sender to input bank-noncustomer information 134. FIG. 13 illustrates typical bank-noncustomer information 134 such as, for example, social security number 142, city 144, state 146, zip code 148, driver's license/state I.D. number 150, issuing state 152, and date of birth 154. The money-mailing system 10 sends at least some of the bank-noncustomer information 134 to the applicant validation network 22 for approval of the sender 16 as a customer. If transmission of the bank-noncustomer information 134 is not successful, the web site 34 preferably displays a "technical difficulties page" and informs the sender 16 that the money-mailing 10 will e-mail the result of the customer approval inquiry when available. If the applicant validation network 22 denies the sender, the web site 34 displays a "denial page" which preferably provides a phone number for the application validation network 22. If the application validation network 22 requires review and a risk decision, the web site 34 displays an "unable to process page" which informs the sender 16 that that the money-mailing system 10 will e-mail the result of the customer approval inquiry when available. Off line, the customer service department 64 of the bank 20 contacts the applicant validation network 22 to make a risk decision regarding the sender 16. If the sender 16 is subsequently denied, an e-mail is sent to the sender 16 informing them of the denial. If the sender 16 is subsequently approved, an e-mail is sent to the sender 16 informing them of the approval and inviting them to return to the money-mailing-system web site 34 to complete the transaction. The sender 16 is also stored in the database 38 as a customer in "good standing". If the applicant validation network 22 requires review because of invalid information 134 such as, for example, an invalid social security number 142 or an invalid driver's license number 150, the web site 34 displays a "review data screen" which displays the bank-noncustomer information 134 and requests the sender 16 to check the bank-noncustomer information 134. The sender 16 is preferably given at least one additional try to input the information 134. If the sender 16 is not approved after a predetermined number of retries, the web site 34 displays the "exit page" which preferably provides a phone number for applicant validation network 22. If the sender 16 is approved, the sender 16 is stored in the database as a customer in "good standing" and the money-mailing system 10 proceeds to the fifth stage 156.

Figure 5:
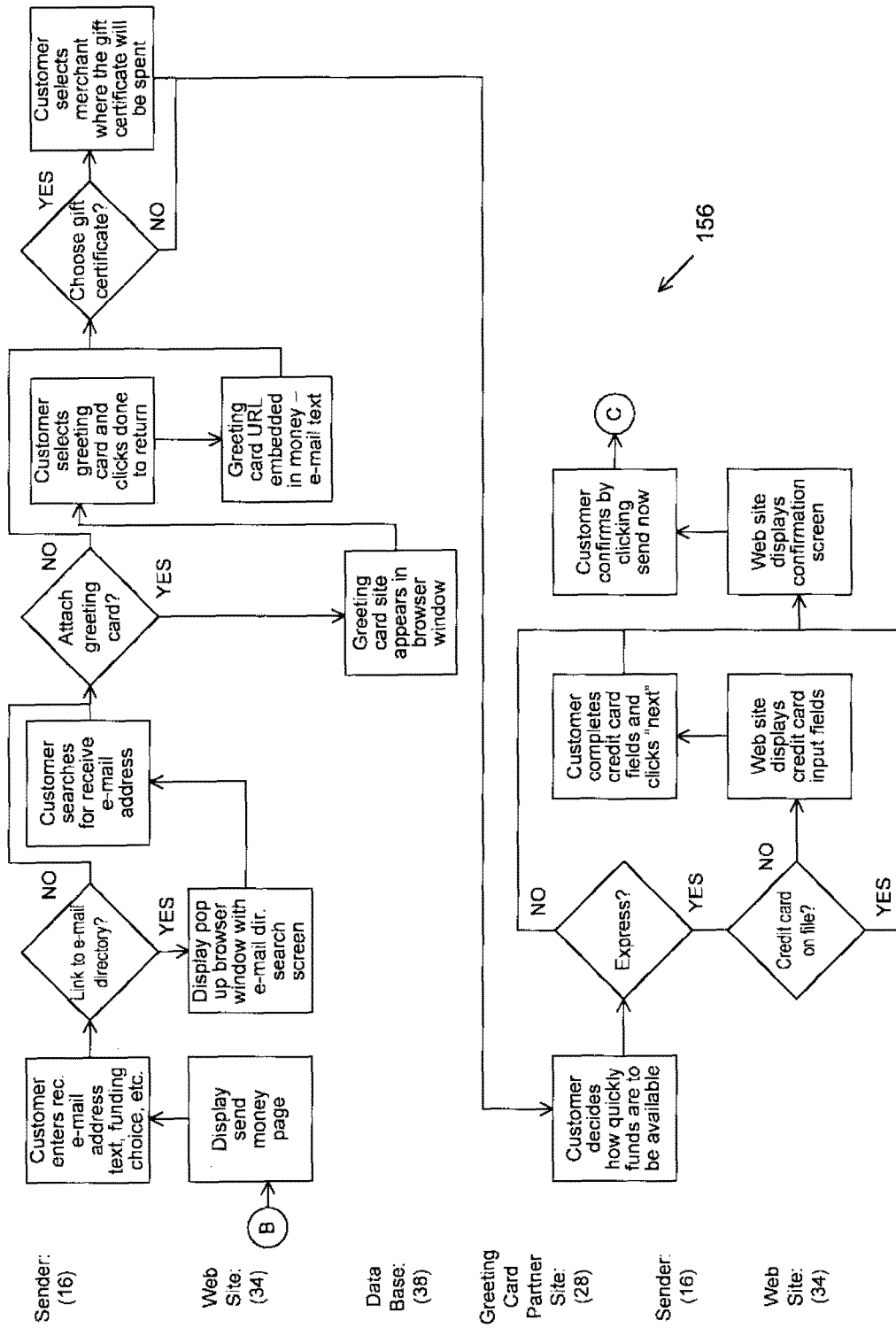
FIG. 5 is a flow chart diagrammatically illustrating a send money process of the money-mailing method of FIG. 2.

The fifth stage 156 of the money-mailing system 10 is a send money process, that is, a process of obtaining information about the desired transaction. As best shown in FIG. 5, the web site 34 displays a "send money page" once the sender 16 is authenticated as a customer in "good standing". The "send money page" requests the sender 16 to provide send-transaction information 158. FIG. 14 illustrates typical send-transaction information 158 such as, for example, the receiver's name 160, the receiver's network or e-mail address 162, a challenge question 164, an expected response 166 to the challenge question 164, the amount of money 170 to be sent to the receiver 18, a subject or title 172 for the e-mail, and a message 174 to be included in the e-mail. The sender 16 is preferably given the opportunity to be linked to an network or e-mail directory to locate the receiver's e-mail address 162 if necessary. The receiver's e-mail address 162 is preferably stored in an address book for the sender's future reference. Preferably, the sender 16 provides the challenge question 164 for the receiver 18 and at least one expected response 166 by the receiver 18. The challenge question 164 should be crafted such that only the sender 16 and the receiver 18 know the answer. Examples of suitable challenge questions 164 (such as, for example, where did we go to eat last Friday? or How much money did I e-mail to you last week?) should be displayed to the sender 16. The challenge question 164 provides an added level of security to ensure that the responding individual is the intended receiver 18 and not someone else who has access to the receiver's e-mail address 162. The sender 16 is also preferably given the opportunity to provide a message 174 to be included in the e-mail.

In the illustrated embodiment, the sender 16 is given the opportunity to attach an electronic greeting card to the e-mail. If the sender 16 chooses to attach an electronic greeting card, the greeting card web site 28 appears in the window and the sender 16 selects a desired greeting card.

The sender 16 then clicks on a "done" button to return to the web page of the web site 34. The money-mailing system 10 preferably embeds a URL of the greeting card web site 28 in the text of the e-mail. It is noted that web sites of greeting card providers can also provide links to the money-mailing system 10 so that customers of the greeting card providers have an opportunity to send money with an electronic greeting card.

It is noted that the money-mailing method can alternatively be initiated from the greeting card site 28. While at the greeting card site 28, the customer is asked if they would like to send money with an electronic greeting card. If the customer chooses to send money, the money-mailing process is initiated. The customer can be visually or transparently transferred to the money-mailing web site 34.

In the illustrated embodiment, the sender 16 is also given the opportunity to send an electronic gift certificate to the receiver 18. If the sender chooses to send an electronic gift certificate, they can select a merchant or merchants where the electronic gift certificate can be used to purchase goods or services. Links can be provided to the merchant site 30 or a clearinghouse site 30 for gift certificates. It is noted that web sites 30 of merchants can provide links to the money-mailing system 10 to provide customers of the merchants an opportunity to send gift certificates to others.

It is noted that the money-mailing method can alternatively be initiated from the merchant or gift certificate web site 30. While at the merchant or gift certificate site 28, the customer is asked if they would like to send a gift certificate to a receiver 18. If the customer chooses to send a gift certificate, the money-mailing process is initiated. The customer can be visually or transparently transferred to the money-mailing web site 34.

As part of the fifth stage 156, the sender 16 is asked to identify what type of account the money is to be withdrawn from, that is to identify a withdraw account. The sender is preferably given the option of identifying a checking account or a credit card account as the withdraw account. When the sender 16 chooses to send money from a checking account, i.e. send a "virtual check", the sender 16 is preferably given a choice of when the funds will be available to the receiver 18 such as, for example, by an "ordinary" check (available in about four days business days) or by an "express" check which is secured by a credit card account (available within about 24 hours).

If the sender 16 chooses an ordinary check, the web site 34 preferably displays an image of a check with fields for required information at typical locations. Once the withdraw account information has been provided such as, for example, bank number, account number, and check number, the web site 34 displays a "confirmation page" which shows information about the transaction including the amount of money to be withdrawn from the checking account. The amount of money to be withdrawn from the checking account is preferably the amount of money requested to be sent to the receiver 18 plus a transaction fee. Once the sender 16 confirms the information, the sender 16 clicks on a "send now" button via a mouse and the money-mailing system proceeds to a sixth stage 196.

Figure 6:
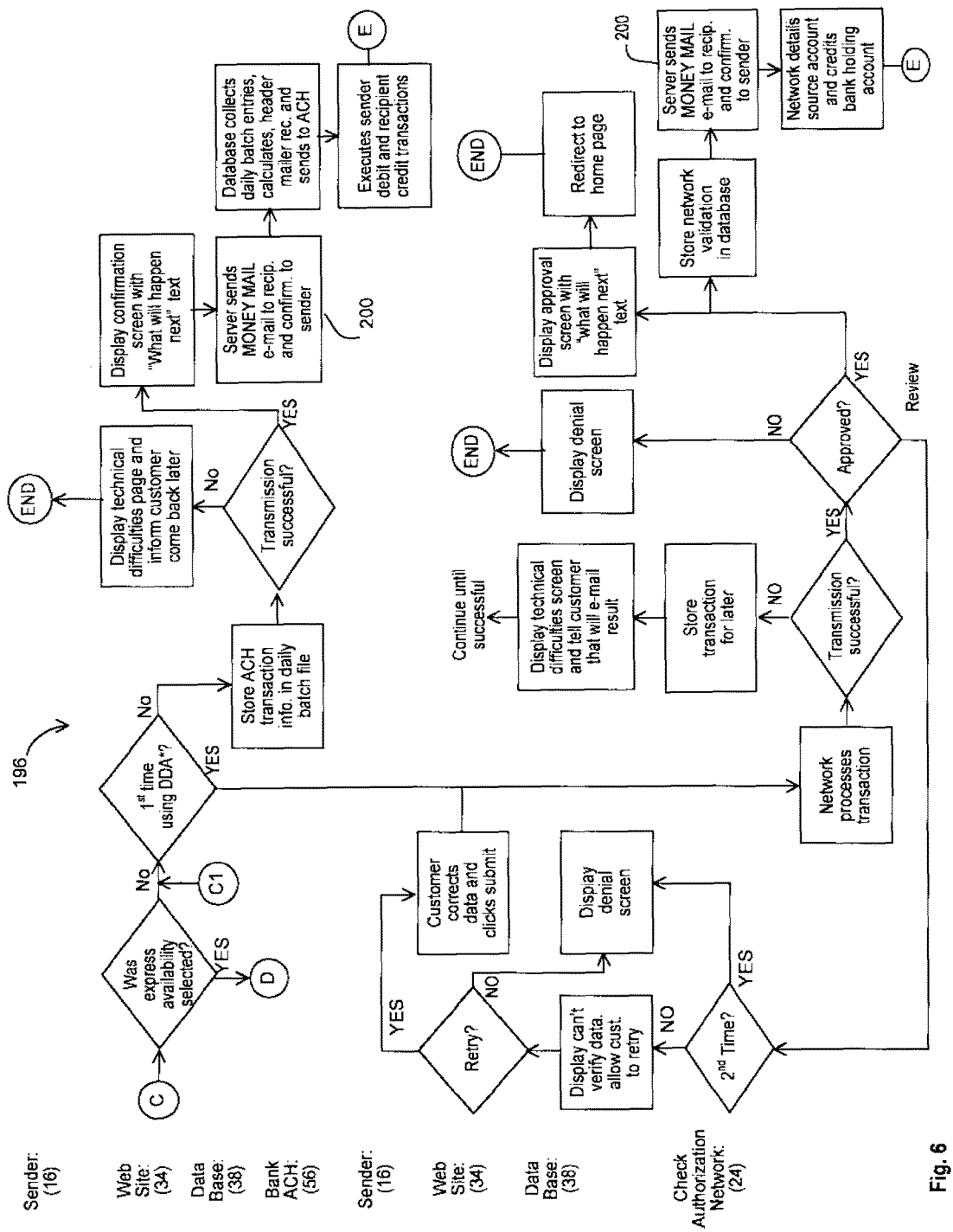
FIG. 6 is a flow chart diagrammatically illustrating a check authorization process of the money-mailing method of FIG. 2.

The sixth stage 196 of the money-mailing system 10 is a check authorization process. As best shown in FIG. 6, if an ordinary check is being sent and it is not the first time the bank account number is being used by the money-mailing system 10, the data base 38 stores the ACH transaction in a daily batch file. If storage of the ACH transaction is not successful, the web site 34 displays a "technical difficulties page" and informs the sender 16 to come back to the web site 34 at a later time to complete the transaction. If storage of the ACH transaction is successful, the web site 34 displays a "confirmation page" which provides a transaction number and information of what will happen next and informs the sender 16 that they can exit the web site 34 or begin another transaction. The money-mailing system 10 proceeds to the eighth stage as described in detail hereinbelow. The database 38 collects the daily batch entries and sends them to the bank ACH 56 which executes a debit to the sender's account and a credit to a bank holding or settlement account.

If an ordinary check is being sent and it is the first time the bank account number 128, 138 has been used by the money-mailing system 10, the check transaction is sent to the check authorization network 24 for approval. If transmission of the check transaction is not successful, the web site 34 preferably displays a "technical difficulties page" and informs the sender 16 that the money-mailing system 10 will e-mail the result of the check approval inquiry when available. If the transmission is successful and the check authorization network 24 denies the transaction, the web site 34 displays a "denial page" which preferably provides a phone number for the check authorization network 24. If the transmission is successful and the check authorization network 24 requires review and discussion, the web site 34 displays an "unable to process page" which informs the sender 16 that that the money-mailing system 10 will e-mail the result of the check approval inquiry when available. Off line, the customer service department 64 of the bank 20 contacts the check authorization network 24 to make a risk decision regarding the check transaction. If it is subsequently decided to deny the check transaction, an e-mail is sent to the sender 16 informing them of the denial. If it is subsequently decided to approve the check transaction, an e-mail is sent to the sender 16 informing them of the approval and confirming completion of the transaction. If the transmission is successful and the check authorization network 24 requires review because of invalid information such as, for example, an invalid routing number, the web site 34 displays a "review data screen" which displays the information and requests the sender to verify the information. The sender 16 is preferably given at least one additional try to input the information. If the check transaction is not approved after a predetermined number of retries, the web site 34 displays a "denial page" which preferably provides a phone number for the check authorization network 24. If the check transaction is approved, the money-mailing system 10 stores the check authorization network validation and the web site 34 displays a "confirmation screen" which provides a transaction number and information of what will happen next and informs the sender 16 that they can now exit the web site 34 or begin another transaction. The money-mailing system 10 proceeds to the eighth stage 200 as described in detail hereinbelow. The check authorization network 24 debits the sender's account and credits a bank holding or settlement account.

If the sender 16 chooses an express check and they have credit-card-information 176 on file, the web site 34 preferably displays an image of a check with fields for required information at typical locations. Once the withdraw account information has been provided such as, for example, bank number, account number, and check number, the web site 34 displays a "confirmation page" which shows information about the transaction including the amount of money to be withdrawn from the checking account. The amount of money to be withdrawn from the checking account is preferably the amount of money requested to be sent to the receiver 18 plus a transaction fee. Once the sender 16 confirms the information, the sender 16 clicks on a "send now" button via a mouse and the money-mailing system 10 proceeds to a seventh stage 198 as described in detail hereinbelow.

If the sender 16 chooses an express check and they do not have credit-card information 176 on file, preferably displays an image of a check and a credit card with fields for required information at typical locations. Once the checking and credit card account information has been provided such as, for example, bank number, checking account number, check number, credit card number, and credit card expiration date, the web site 34 displays a "confirmation page" which shows information about the transaction including the amount of money to be withdrawn from the checking account or debited to the credit card account. The amount of money to be withdrawn from the checking account or debited to the credit card account is preferably the amount of money requested to be sent to the receiver 18 plus a transaction fee. Once the sender 16 confirms the information, the sender 16 clicks on a "send now" button via a mouse and the money-mailing system 10 proceeds to the seventh stage.

If the sender 16 chooses a credit card account and they have credit-card-information 176 for that account on file, the web site 34 displays a "confirmation page" which shows information about the transaction including the amount of money to be debited from the credit card account. The amount of money to be debited from the credit card account is preferably the amount of money requested to be sent to the receiver 18 plus a transaction fee. Once the sender 16 confirms the information, the sender 16 clicks on a "send now" button via a mouse and the money-mailing system 10 proceeds to a seventh stage 198 as described in detail hereinbelow.

If the sender 16 chooses a credit card and they do not have credit-card information 176 on file, the web site 34 displays a "credit-card information page" which requests the sender to input the credit-card information 176. FIG. 15 illustrates suitable credit-card information 176 such as, for example, credit card account number 178. expiration date 180, card verification value (CVV) 182, first and last names 184, 186 (as appearing on the card), street address 188, city 190, state 192, and zip code 194. Preferably, the web site 34 displays an image of a credit card with fields for the required information at typical locations. Once all of the fields are completed, the sender 16 clicks on a "next" button via a mouse and the web site 34 displays a "confirmation page" which shows information about the transaction including the amount of money to debited from the credit card account. The amount of money to be debited from the credit card account is preferably the amount of money requested to be sent to the receiver 18 plus a transaction fee. Once the sender 16 confirms the information, the sender 16 clicks on a "send now" button via a mouse and the money-mailing system 10 proceeds to the seventh stage.

Figure 7:
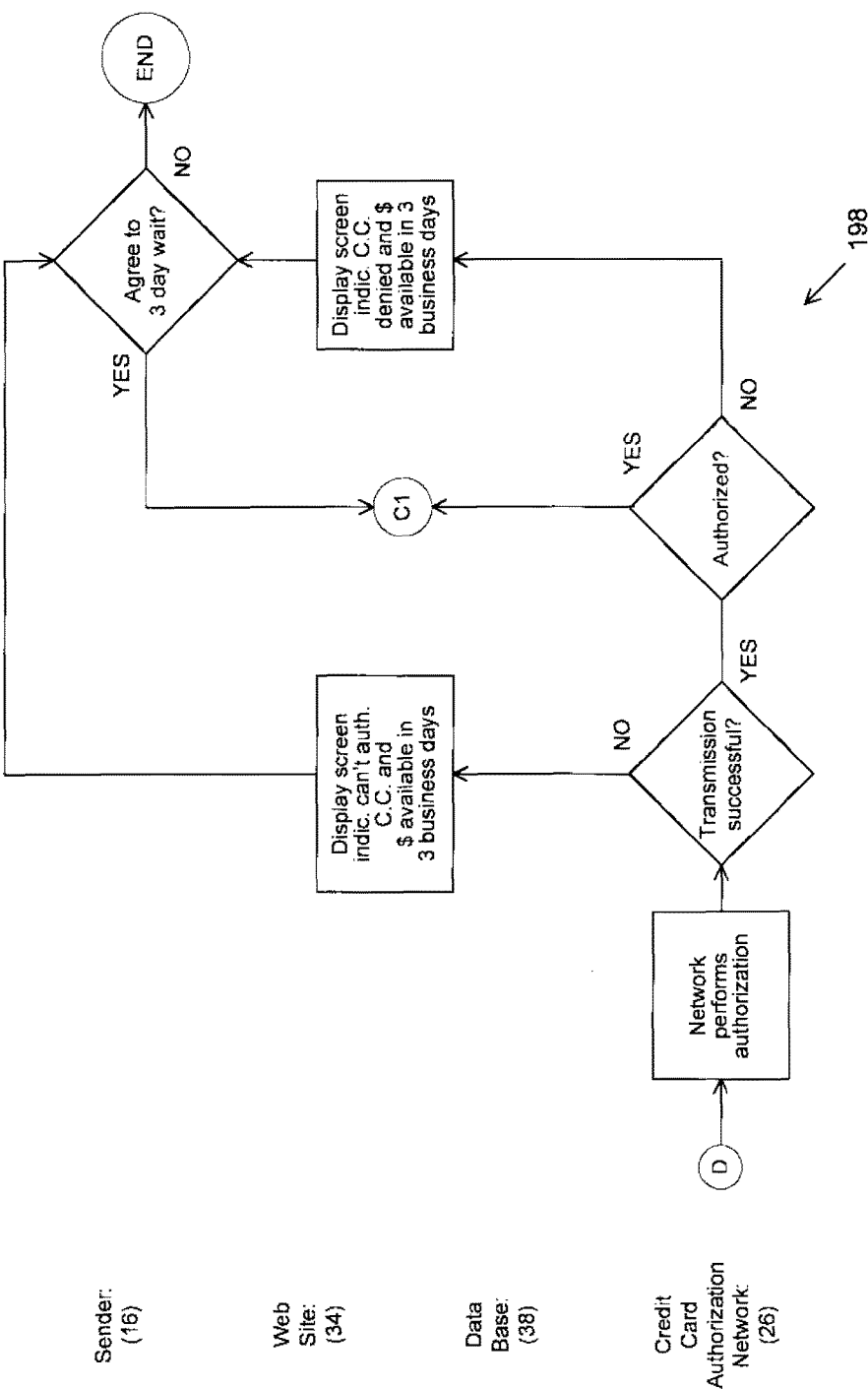
FIG. 7 is a flow chart diagrammatically illustrating a credit card authorization process of the money-mailing method of FIG. 2.

The seventh stage 198 of the money-mailing system 10 is a credit card authorization process. As best shown in FIG. 7, if an express check or credit card is requested, the web server 34 transmits the credit card transaction to the credit card authorization network 26. If the transmission of the credit card transaction is not successful, the web site 34 displays a "technical difficulties page" and informs the sender 16 that the credit card cannot be authorized at this time and that check funds can be available in four business days with an ordinary check transaction. If the sender 16 does not agree to the four day waiting period, the web site displays an "exit page". If the sender 16 agrees to the four day waiting period, the money-mailing system 10 proceeds to the sixth stage 196 as described in detail hereinabove 196 (the same as for an ordinary check). If the transmission of the credit card transaction is successful and the credit card transaction is denied, the web site 34 displays a 66 "credit card denial page" and informs the sender 16 that the check funds can be available in four business days. If the sender 16 does not agree to the four day waiting period, the web site 34 displays an "exit page". If the sender 16 agrees to the four day waiting period, the money-mailing system 10 proceeds to the sixth stage 196 as described in detail hereinabove (the same as for an ordinary check). If the transmission of the credit card transaction is successful and the credit card transaction is for an express check and is approved, the money-mailing system 10 proceeds to the sixth stage 196 as described in detail hereinabove (the same as for an ordinary check). If the transmission of the credit card transaction is successful and the credit card transaction is for an ordinary credit card transaction and is approved, the money-mailing system 10 proceeds to the eighth stage 200.

The eighth stage 200 of the money-mailing system 10 is an e-mail sending process. The money-mailing system 10 sends an e-mail to the receiver 18 informing them of money sent from the sender 16 and providing instructions to go to the money-mailing-system web site 34 to receive the money. Preferably, the e-mail is provided with an embedded link (URL) to the money-mailing-system web site 34. The money-mailing system 10 also sends an e-mail to the sender 16 confirming that the e-mail with money has been sent to the receiver 18.

Figure 8:
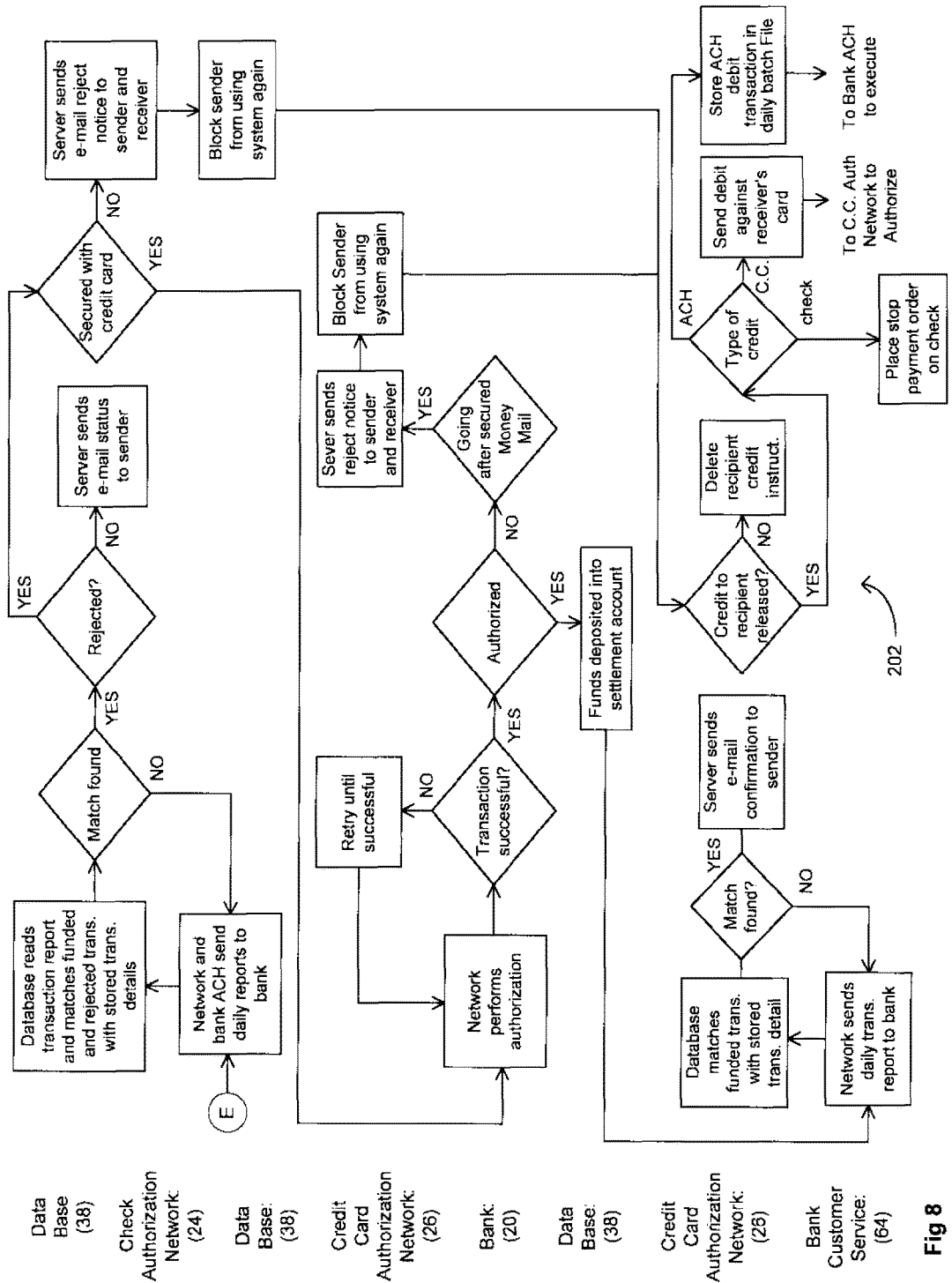
FIG. 8 is a flow chart diagrammatically illustrating a settlement process of the money-mailing method of FIG. 2.

A ninth stage 202 of the of the money-sending system 10 is a settlement process. As best shown in FIG. 8, the check authorization network 24 and the bank ACH 56 send daily transaction reports to the bank 20. The database 36 reads the daily transaction reports and searches for matches between stored transactions of the money-mailing system 10 and funded or rejected transactions of the daily transaction reports. If a funded match is found, the web server 32 sends an e-mail to the sender 16 informing the sender 16 of the status of the transaction.

If a rejected match is found and it was an ordinary check, that is a check not secured with a credit card, the web server 34 sends an e-mail to the sender 16 and the receiver 18 informing each of them of the rejection. The money-mailing system 10 preferably blocks anyone using the account of the sender 16 from using the money-mailing system 10 again by flagging the account as belonging to a customer "not in good standing". If the funds have not been released to the receiver 18, the credit instruction to the receiver 18 is removed. If the funds have been released to the receiver 18 steps may be taken to legally recoup the released funds. For example, if the funds have been released to the receiver 18 and the funds were released via a paper check, the bank customer service department 64 may issue a stop payment order on the paper check.

If a rejected match is found and it was an express check transaction, that is a check transaction secured with a credit card, the web server 34 sends a debit transaction to the credit card authorization network 26. If the credit card transaction is denied, the web server 34 sends an e-mail to the sender 16 and the receiver 18 informing each of them of the rejection. The money-mailing system 10 preferably blocks anyone using the account of the sender 16 from using the money-mailing system 10 again by flagging the account as belonging to a customer "not in good standing". If the funds have not been released to the receiver 18, the credit instruction to the receiver 18 is removed. If the funds have been released to the receiver 18, steps may be taken to legally recoup the released funds. For example, if the funds have been released to the receiver 18 and the funds were released via a paper check, the bank customer service department 64 issues a stop payment order on the paper check. If the credit card transaction is approved, the funds are deposited into a settlement account. The database 36 reads the daily transaction reports and searches for a match between credit card and funded or rejected transactions of the daily transaction reports. When a funded match is found, the web server 32 sends an e-mail to the sender 16 informing the sender 16 of the status of the credit card transaction.

Figure 9:
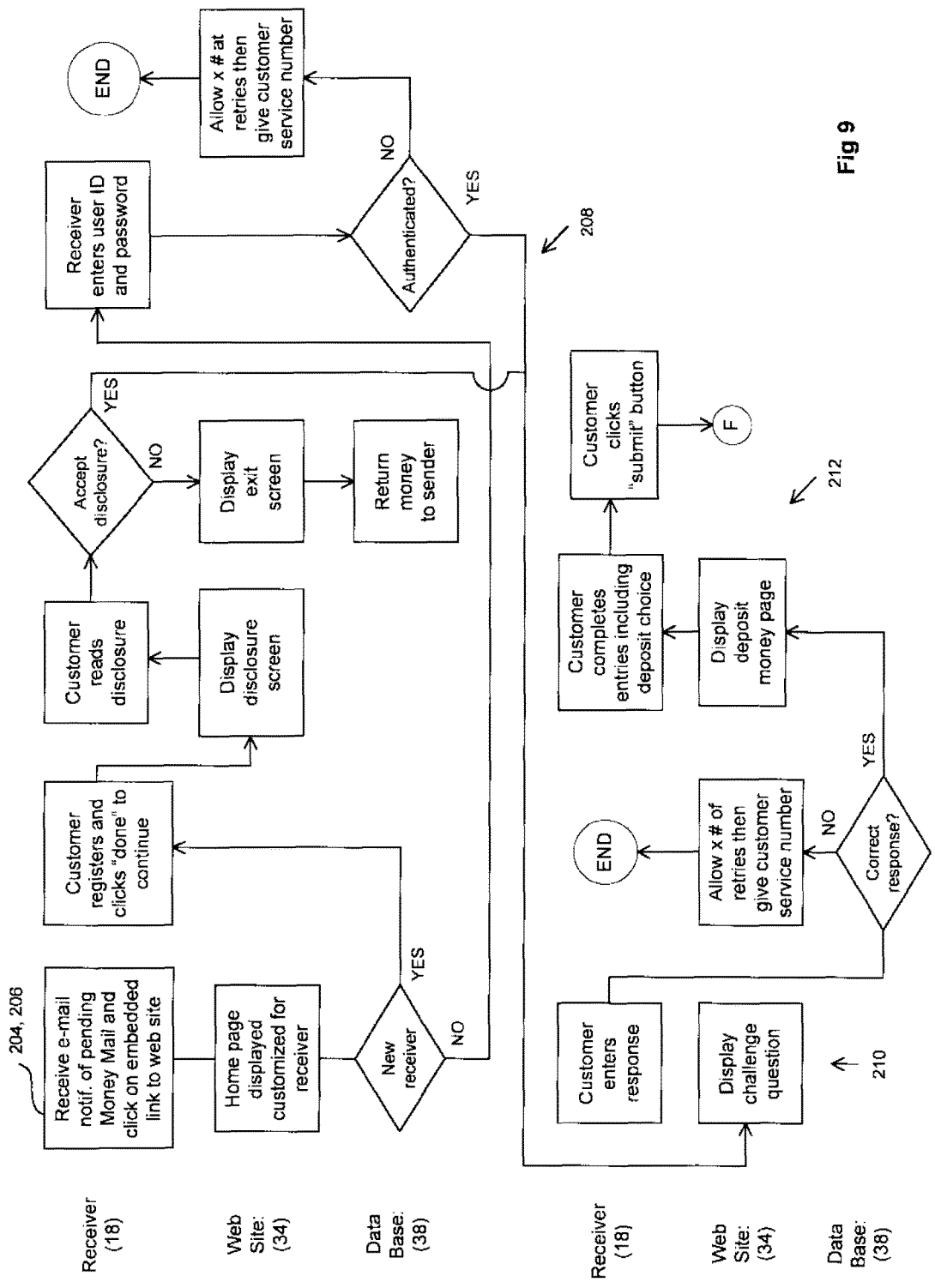
FIG. 9 is a flow chart diagrammatically illustrating registration and/or login process for the receiver, a challenge question process, and a receive money process of the money-mailing method of FIG. 2.

Tenth and eleventh stages 204, 206 of the money-mailing system 10 are respectively, an e-mail receiving process and a web-site visiting process. As best shown in FIG. 9, the receiver 18 preferably clicks on an embedded link to the web site 34 when the receiver 18 receives the e-mail informing them of the money sent from the sender 16. The web site 34 preferably displays a "home page" customized for receivers 18 and inquires whether the receiver 18 is a first time receiver from the money-mailing system 10.

A twelfth stage 208 of the money-mailing system 10 is a registration and/or login process for the receiver. If the receiver 18 is not a first time receiver, they are requested to enter their login name and password. The money-mailing system 10 then authenticates that the login name and the password input by the receiver 18 are for a customer in "good standing". If the input information cannot be authenticated, the receiver 18 is preferably given at least one additional try to input the information. If the receiver 18 fails to be authenticated within a predetermined number of retries, the web site 34 displays an "exit page" which preferably provides a phone number for the customer service department 64. If the receiver 18 is authenticated, the money-mailing system 10 proceeds to a thirteenth stage 210 as described in detail hereinbelow.

If the receiver 18 is a first time receiver 18, the web site 34 displays a "new receiver page" and requests the receiver 18 to register as a receiver 18 by providing receiver-identification information which can be similar to the sender-identification information 106. Once the requested receiver-identification information is input, the receiver 18 clicks on a "done" button via a mouse to continue. The web site 34 then displays a "disclosure page" showing a disclosure regarding the money-mailing system 10 and requests the receiver 18 to read the disclosure and indicate whether they accept the terms of the disclosure. If the receiver 18 does not accept the terms of the disclosure, the web site 34 displays the "exit page". If the receiver 18 accepts the terms of the disclosure, the money-mailing system 10 begins a process of authenticating the receiver-identification information provided by the receiver 18 to approve or deny the receiver 18 as a customer in "good standing". If the receiver 18 is authenticated, the money-mailing system 10 proceeds to the thirteenth stage 210. It is noted that the challenge question portion of the money-mailing method can be eliminated if desired such as, for example, when the sender 16 is sending money to a charitable organization.

The thirteenth stage 210 of the money-mailing system 10 is a challenge question process. Once the receiver 18 is authenticated as a customer in "good standing", the web site 34 displays the challenge question 164 and requests the receiver 18 to respond. If the receiver 18 fails to respond to the challenge question 164 with the valid response 166, the receiver 18 is preferably given at least one additional try to correctly respond. If the receiver 18 fails to correctly respond within a predetermined number of retries, the web site 34 displays an "exit page" which preferably provides a phone number for the customer service department 64. The money-mailing system 10 also sends an e-mail to the sender 16 informing them of receiver's failure to correctly respond to the challenge question 164. If the receiver 18, correctly responds to the challenge question 164, the money-mailing system 10 proceeds to a fourteenth stage 212.

The fourteenth stage 212 of the money-mailing system 10 is a receive money process. If the receiver 18 correctly responds to the challenge question 164, the web site 34 displays a "deposit money page" and requests the receiver 18 to identify a deposit account for receiving the money, such as, for example, by electronic deposit to a checking or savings account (a direct deposit), a credit to a credit card account, or by paper check. Once the receiver 18 chooses deposit account, the receiver clicks on a "submit" button via a mouse and the money-mailing system 10 proceeds to a fifteenth stage 214 (if an electronic deposit), to a sixteenth stage 216 as described in detail hereinbelow (if a credit card credit), or to a seventeenth stage 218 as described in detail hereinbelow (if a paper check).

Figure 10:
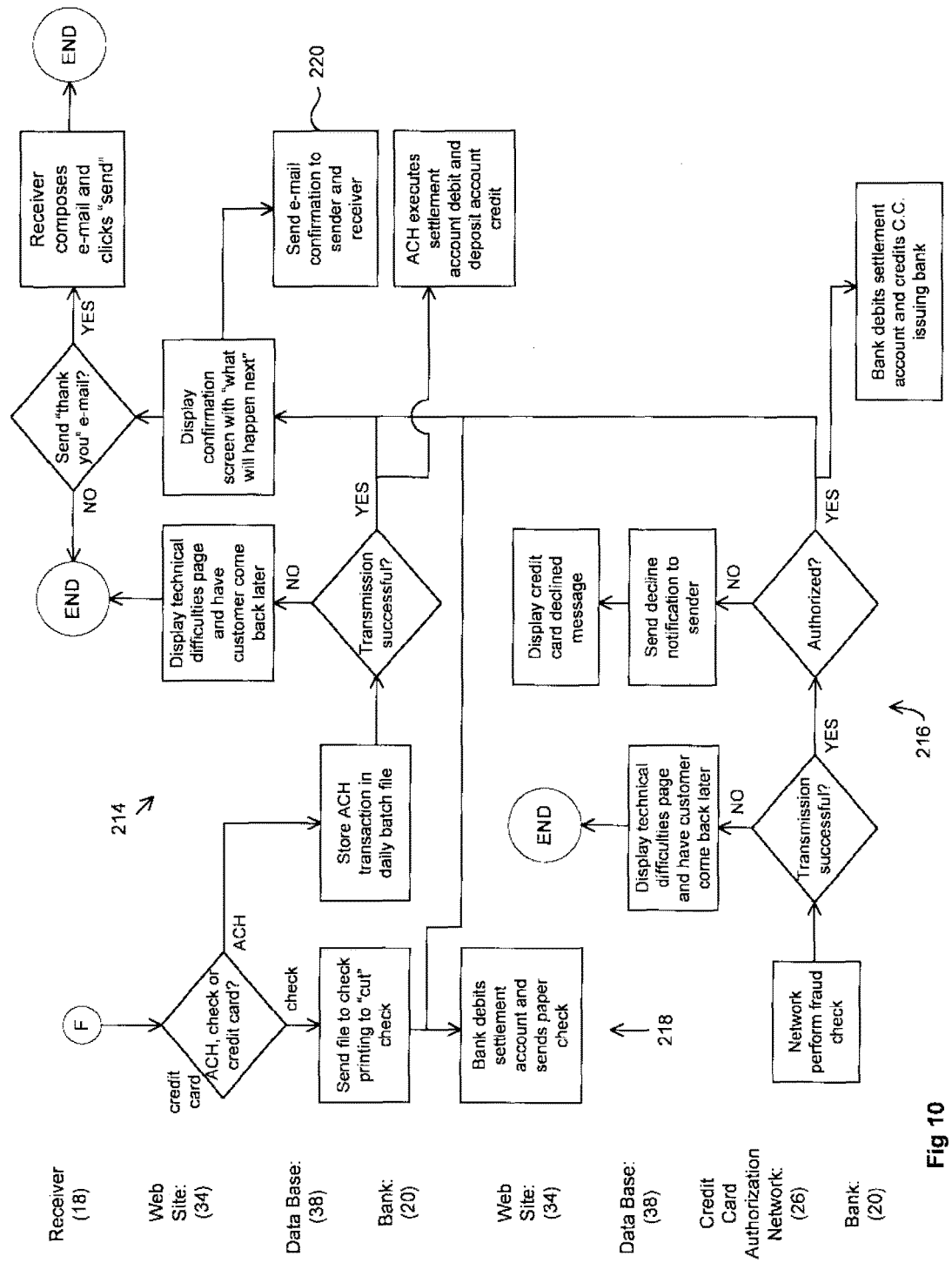
FIG. 10 is a flow chart diagrammatically illustrating recipient an ACH account process, a credit card account process, and a paper check process of the money-mailing method of FIG. 2.

The fifteenth stage 214 of the money-mailing process 10 is an ACH account process. As best shown in FIG. 10, if an ACH transaction is selected by the receiver 18, the data base 38 stores the ACH transaction in the daily batch file. If storage of the ACH transaction is not successful, the web site 34 displays a "technical difficulties page" and informs the receiver 18 to come back to the web site 34 at a later time to complete the transaction. If storage of the ACH transaction is successful, the web site 34 displays a "confirmation page" which provides information of what will happen next and informs the receiver 18 that they can now exit the web site 34 or begin another transaction. Preferably, the receiver 18 is given the opportunity to send a "thank you" e-mail to the sender 16. The money-mailing system 10 proceeds to an eighteenth stage 220 as described in detail hereinbelow. The money-mailing-system database 38 collects the daily batch entries and sends them to the bank ACH 56 which executes a debit to the settlement account and a credit to the receiver's account.

The sixteenth stage 216 of the money-mailing process 10 is a credit card account process. If a credit to a credit card account is selected, the credit card transaction is sent to the credit card authentication network 26 to perform a "fraud check". If the transmission of the credit card transaction is not successful, the web site 34 displays a "technical difficulties page" and informs the receiver 18 to come back to the web site 34 at a later time to complete the transaction. If the transmission of the credit card transaction is successful and the credit card transaction is denied, the web site 34 displays a "credit card denied page" and preferably provides a customer service phone number or a message for the customer to contact his or her issuing bank. If the transmission of the credit card transaction is successful, and the credit card transaction is approved, the web site 34 displays a "confirmation page" which provides information of what will happen next and informs the receiver 18 that they can now exit the web site 34 or begin another transaction. Preferably, the receiver 18 is given the opportunity to send a "thank you" e-mail to the sender 16. The money-mailing system 10 proceeds to the eighteenth stage 220 as described in detail hereinbelow. The money-mailing-system database 38 collects the daily batch entries and sends them to the bank 20 which executes a debit to the settlement account and a credit to the receiver's account at the credit card issuing bank.

The seventeenth stage 218 of the money-mailing process 10 is a paper check process. If a paper check is chosen, the web site 34 captures the recipient's physical mailing address and displays a "confirmation page" which provides information of what will happen next and informs the receiver 18 that they can now exit the web site 34 or begin another transaction. Preferably, the receiver 18 is given the opportunity to send a "thank you" e-mail to the sender 16. The money-mailing system database 38 sends a "cut check" request to the bank check printing service 254. The bank check printing service 254 sends a paper check to the receiver 18 via a physical mail service and the bank holding or settlement account is debited once the paper check is cashed. The paper check is preferably for the amount sent by the sender 16 less a check printing fee. The money-mailing system 10 proceeds to the eighteenth stage 220.

An eighteenth stage 220 of the money-sending system 10 is an e-mail sending process. The money-mailing system 10 sends an e-mail to the sender 16 and the receiver 18 confirming the status of the transaction. It is noted that the above-described money-mailing system 10 operates in a seamless manner and the identified divisions between the various stages is for descriptive purposes only. It is also noted that each of the stages and/or steps within each stage are not required for each transaction and each of the stages and/or steps within each stage can occur in a different order except as specifically noted.

Figure 16:
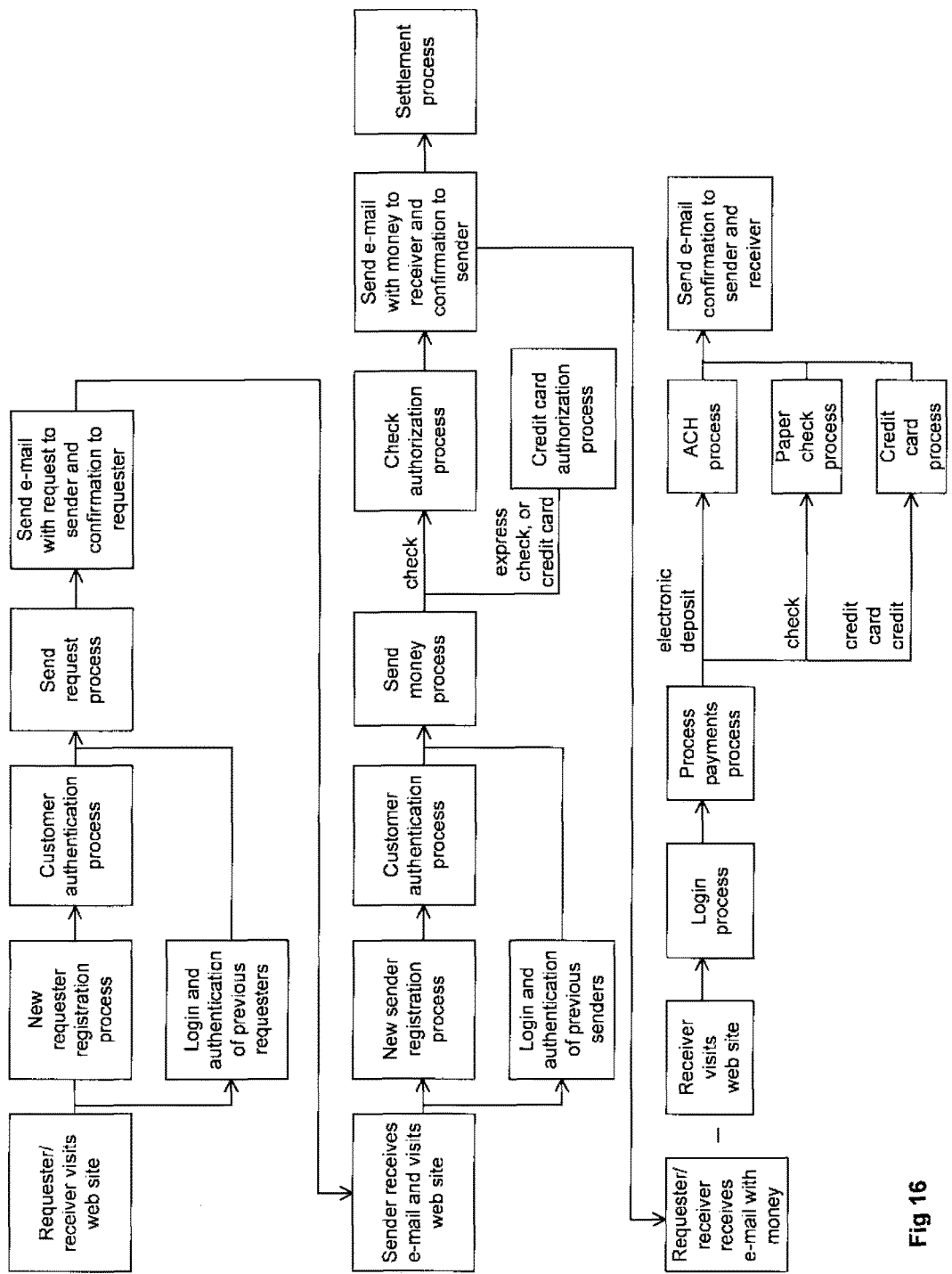
FIG. 16 is a flow chart diagrammatically illustrating a second embodiment of the money-mailing-method of FIG. 2.

FIG. 16 illustrates a second embodiment of the money-mailing method wherein the sender 16 (such as a customer or a charitable giver) sends e-mailed money to the receiver 18 (such as a merchant or a charitable organization) in response to an e-mailed invoice or request. The second embodiment of the money-mailing method can operate generally the same as described above with regard to the first embodiment except that the receiver 18 initiates the transaction rather than the sender 16. Therefore, this variation of the money-mailing system is particularly useful for merchants to send invoice e-mails to customers or charitable organizations to send solicitation e-mails to potential givers. An invoice e-mail to a sender 16 would preferably specify the amount of money to be sent to the receiver 18 while a solicitation e-mail from a charitable organization would preferably not specify the amount of money to be sent unless it is a notice or reminder of a previous pledge. In a receiver initiated transaction, the money deposited into the receiver's account is preferably the amount of money sent from the sender less a fee for initiating the transaction. The receiver 18 can preferably visit the web site 34 separate from an embedded link in the e-mail so that multiple transactions can be more easily processed. The web site 34 preferably has an "inbox" which lists all deposits for the receiver 18 to expedite batch processing of multiple deposits all at once.

It is apparent from the above description that the money-mailing system and method of the present invention enable one computer network user (the sender) to easily and rapidly send money to another computer network user (the receiver). Importantly, the receiver is not required to have a credit card merchant account and the sender is not required to have a credit card.

Rebate Embodiment

Figure 17:
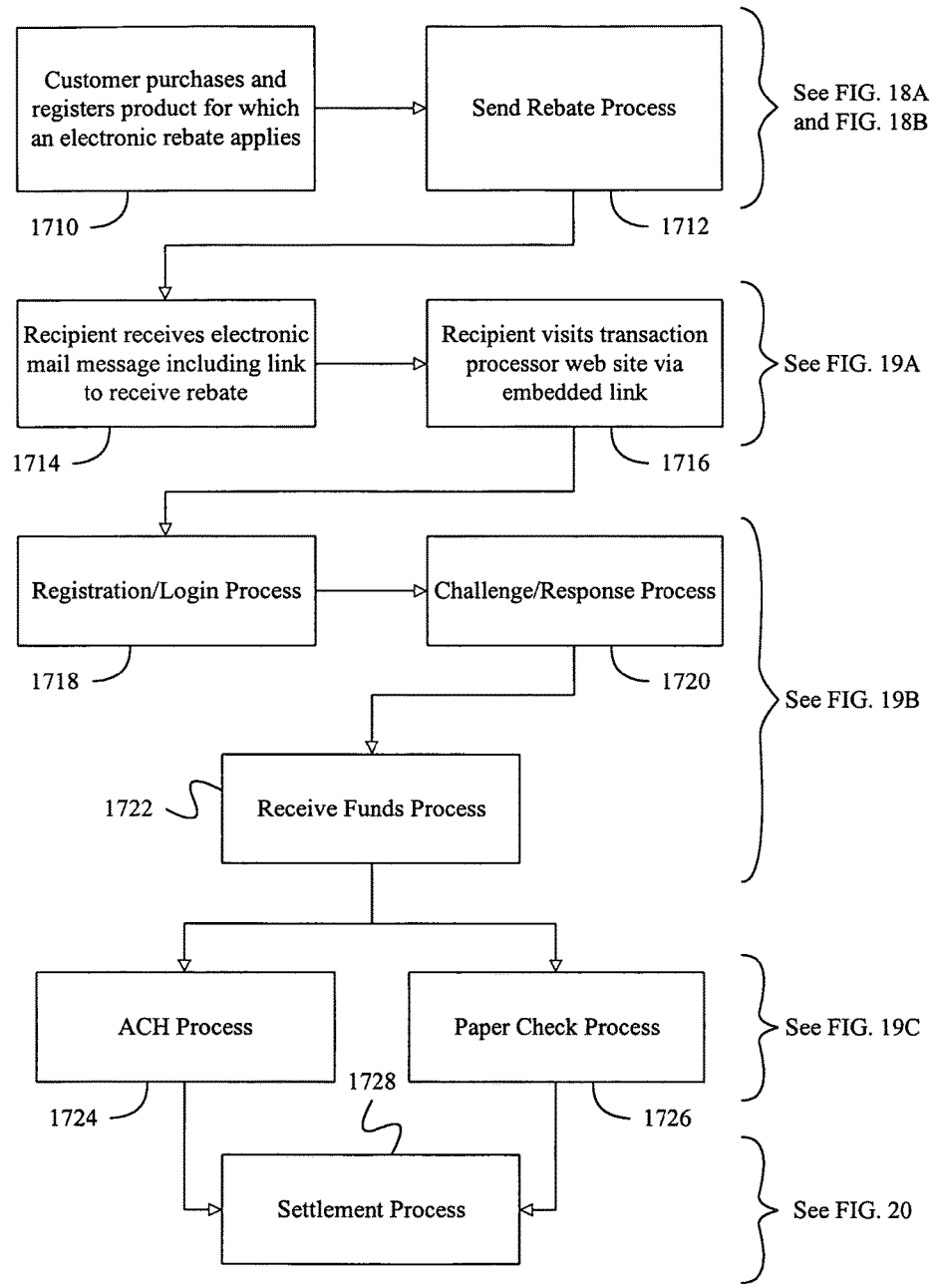
FIG. 17 is a flow chart diagrammatically illustrating methods for sending and receiving over a computer network using the money-mailing system of FIG. 1 rebate funds associated with a conventional purchase.

FIGS. 17-20 illustrate preferred methods according to the present invention for sending and receiving funds over a computer network such as the Internet 12 using the money-mailing system 10 of FIG. 1, wherein the funds represent a rebate associated with a conventional sale of goods or services. Referring to FIG. 17, there is illustrated a method for initiating a rebate funds transfer associated with a conventional sale of goods and services, including blocks 1710 and 1712.

The first stage 1710 of the rebate funds initiation method is a product purchase and registration process. A customer purchases a product for which an electronic rebate applies, and registers the purchase. The steps of the registration process are shown in more detail with reference to FIG. 18A.

Figure 18A:
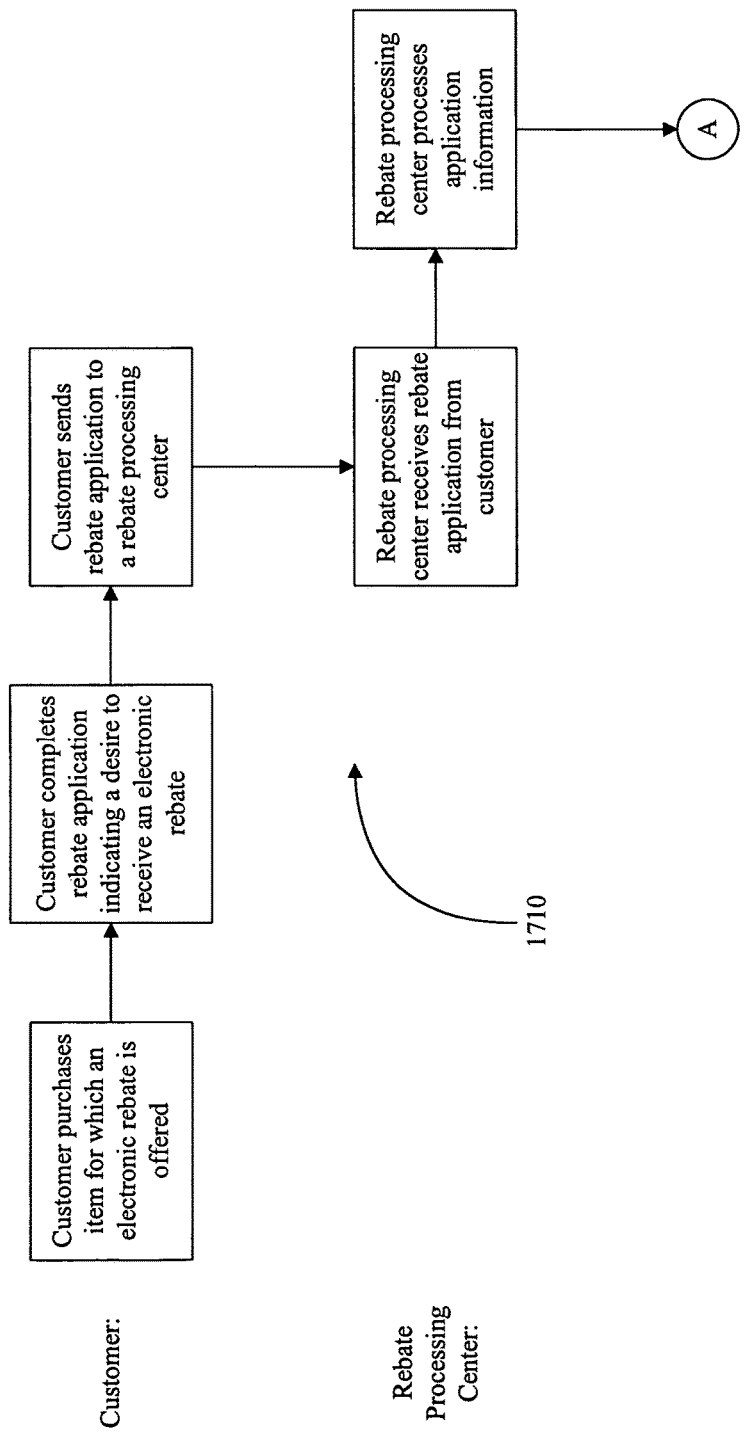
FIGS. 18A-18B are flow charts illustrating various processes comprising the method of initiating a funds transfer of a rebate, generally depicted in FIG. 17.
Figure 18B:
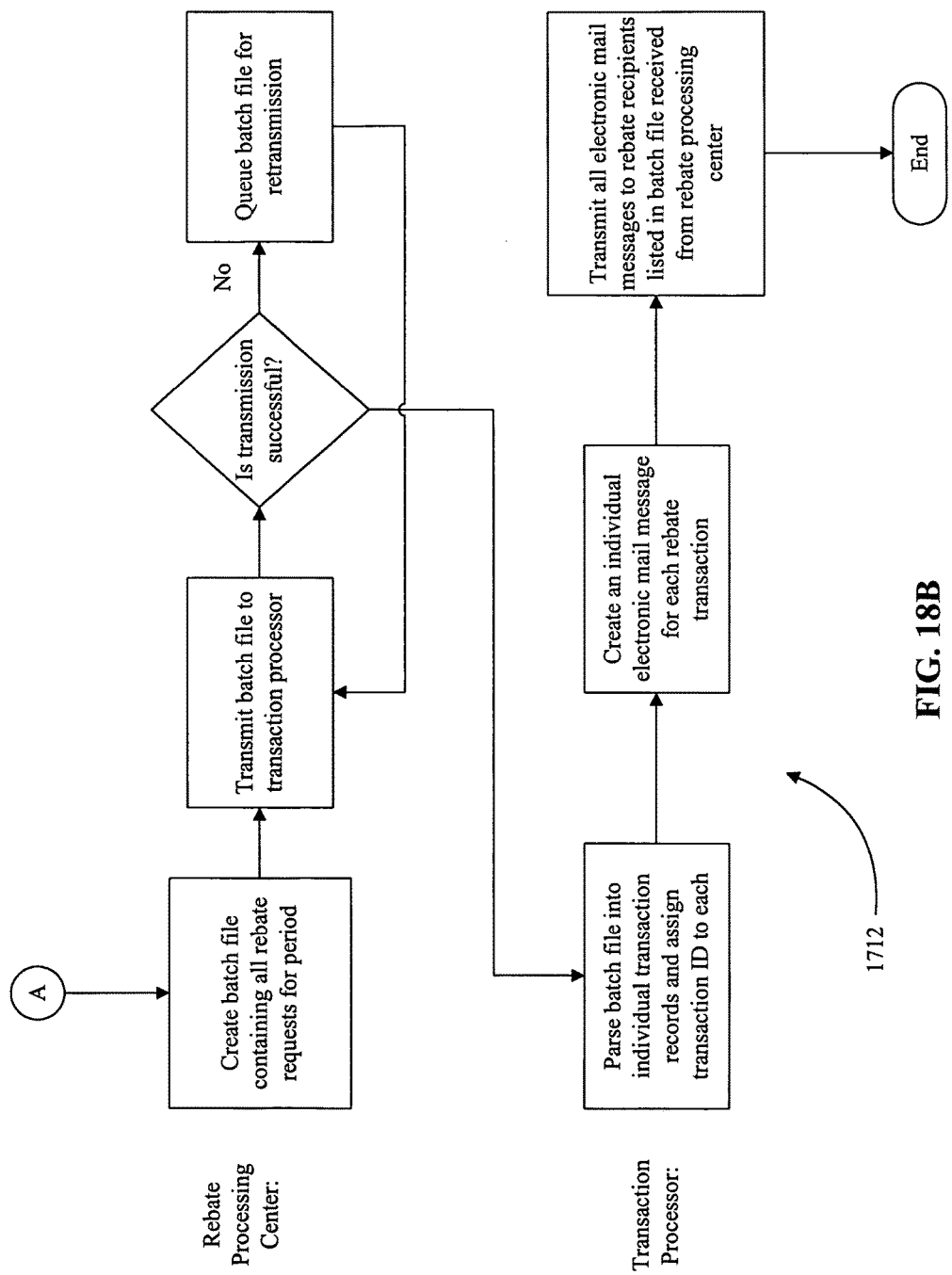

According to the product purchase and registration process shown in FIG. 18A, the customer purchases, in a conventional manner, an item for which an electronic rebate is offered. The customer completes a rebate application indicating a desire to receive an electronic rebate. The customer sends the rebate application to a processing center. Of course, the processing center may be operated by one of a variety of entities, including the manufacturer of the product, the retailer, or an agent of either the manufacturer or retailer. The rebate processing center receives the rebate application from the customer and processes the information contained in the application.

The second stage 1712 of the rebate funds initiation method is a send rebate process, effectively "attaching" the funds to an electronic mail message. The send rebate process is shown in more detail with reference to FIG. 18B.

According to the send rebate process, the rebate processing center creates a batch file containing data associated with all rebate applications processed within a defined period. For example, batch files may be created daily or weekly. The rebate processing center transmits the batch file to a transaction processor, such as database server 38. The transaction processor returns a signal indicating whether the transaction was successfully received and stored. If the signal indicates that the transaction was not successfully received and stored, the rebate processing center queues the file to be retransmitted.

Upon successful transmission of the batch file, the transaction processor parses the file into individual transaction records and assigns a transaction ID to each record. An individual e-mail message is created for each rebate transaction record. Preferably, each e-mail message is customized using data from the rebate application to provide individualized service. The transaction processor then transmits all of the e-mail messages to their respective rebate recipients.

In order to properly account for the rebate funds, the rebate processing center periodically prepares and sends a batch file containing monetary data related to the transactions processed. Alternatively, the transaction processor may be responsible for preparing and sending the batch file. In either case, the batch file, which is preferably an ACH batch file in standard NACHA format, is received and processed by the bank or ACH, and a reconciliation report is prepared and transmitted to the appropriate entity.

Figure 19A:
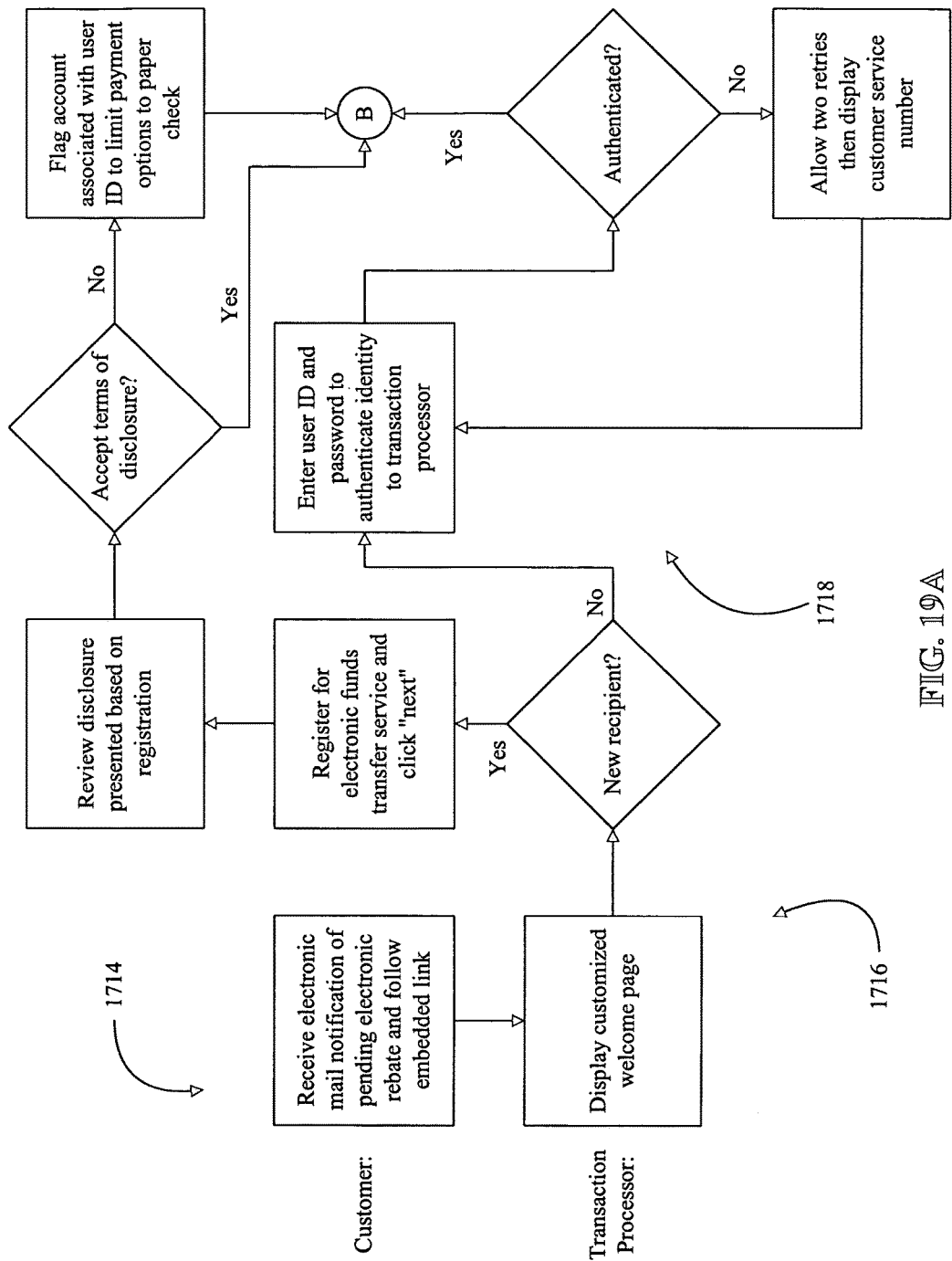

Referring back to FIG. 17, the method for transferring rebate funds generally includes steps 1714-1722. In the first stage of the method, shown in detail in FIG. 19A, recipient 18 receives the e-mail notification from the transaction processor and follows the embedded link to connect with the transaction processor web site. As shown by FIG. 19A, once the customer is connected to the transaction processor web site, a customized welcome page is displayed based on the rebate application data provided by the customer.

If the recipient 18 is a first time recipient, the web site 34 displays a "new recipient page" and requests the recipient 18 to register as a recipient 18 by providing recipient-identification information which can be similar to the sender-identification information 106. Once the requested recipient-identification information is input, the recipient 18 clicks on a "next" button via a mouse to continue. The web site 34 then displays a "disclosure page" showing a disclosure regarding the terms and conditions for using money-mailing system 10 and requests the recipient 18 to read the disclosure and indicate whether they accept the terms of the disclosure. If the recipient 18 does not accept the terms of the disclosure, the web site 34 displays the "exit page". If the recipient 18 accepts the terms of the disclosure, the money-mailing system 10 begins a process of authenticating the recipient-identification information provided by the recipient 18 to approve or deny the recipient 18 as a customer in "good standing". If the recipient 18 is authenticated, the money-mailing system 10 proceeds to the challenge question process 1720.

If the recipient 18 is not a first time recipient, he/she is requested to enter his/her user ID and password to authenticate the customer's identity to the money-mailing system 10. The money-mailing system 10 then authenticates that the login name and the password input by the recipient 18 are for a customer in "good standing". If the input information cannot be authenticated, the recipient 18 is preferably given at least one additional try to input the information. If the recipient 18 fails to be authenticated within a predetermined number of retries, the web site 34 displays an "exit page" which preferably provides a phone number for the customer service department 64. If the recipient 18 is authenticated, the money-mailing system 10 proceeds to the challenge question process 1720.

Figure 19B:
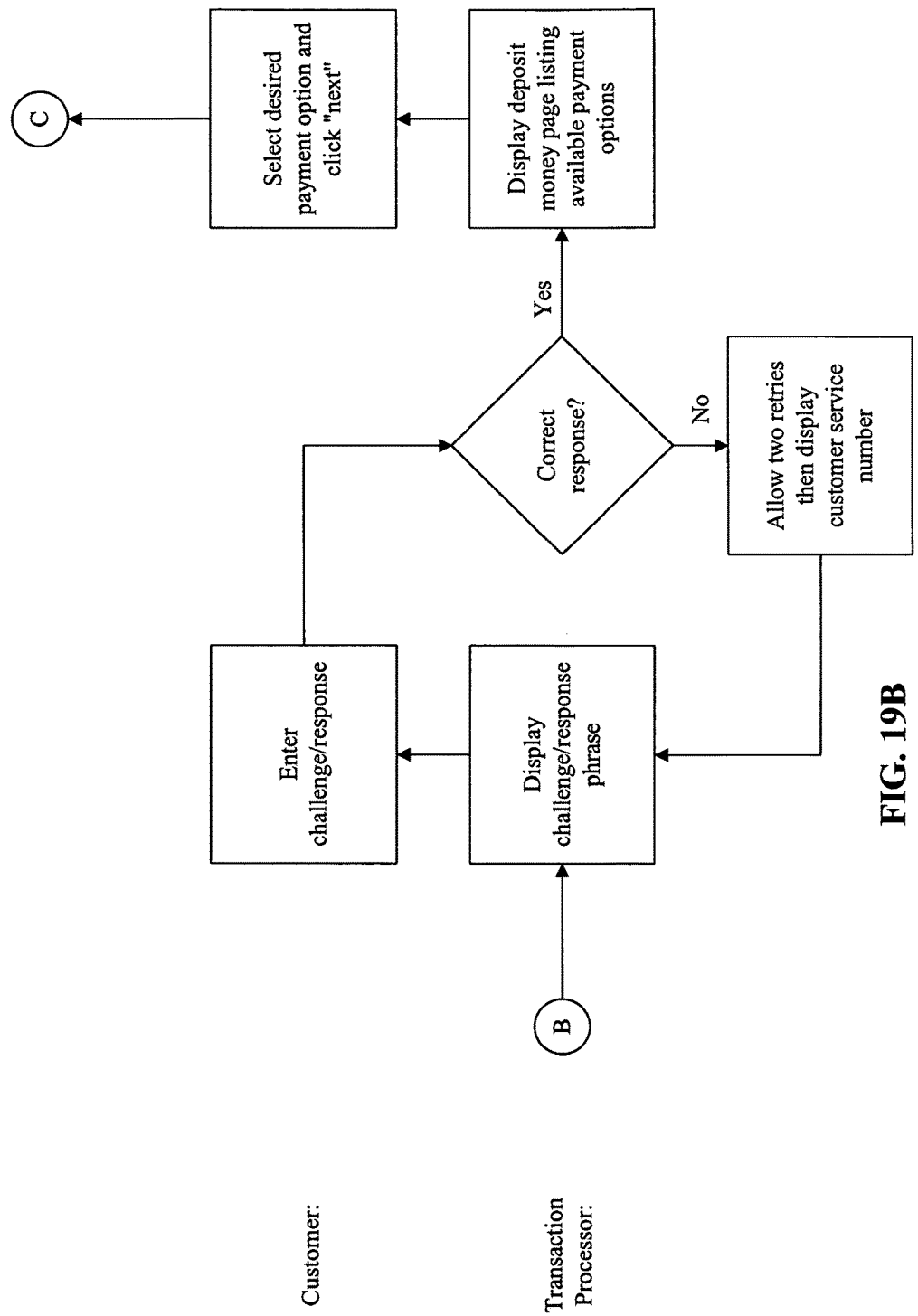

As shown in detail by FIG. 19B, the challenge question process 1720 directs the web site 34 to display the challenge question 164 and requests the recipient 18 to respond. If the recipient 18 fails to respond to the challenge question 164 with the valid response 166, the recipient 18 is preferably given at least one additional try to correctly respond. If the recipient 18 fails to correctly respond within a predetermined number of retries, the web site 34 displays an "exit page" which preferably provides a phone number for the customer service department 64. The money-mailing system 10 may also send an e-mail to the rebate processor informing it of the recipient's failure to correctly respond to the challenge question 164.

If the recipient 18 correctly responds to the challenge question 164, the web site 34 displays a "deposit money page" and requests the recipient 18 to identify a deposit account for receiving the money, such as, for example, by electronic deposit to a checking or savings account (a direct deposit) or by paper check. Once the recipient 18 chooses deposit account, the recipient clicks on a "next" button via a mouse and the money-mailing system 10 proceeds to the appropriate process (ACH process 1724 or paper check process 1726) depending on the recipient's payment selection.

Figure 19C:
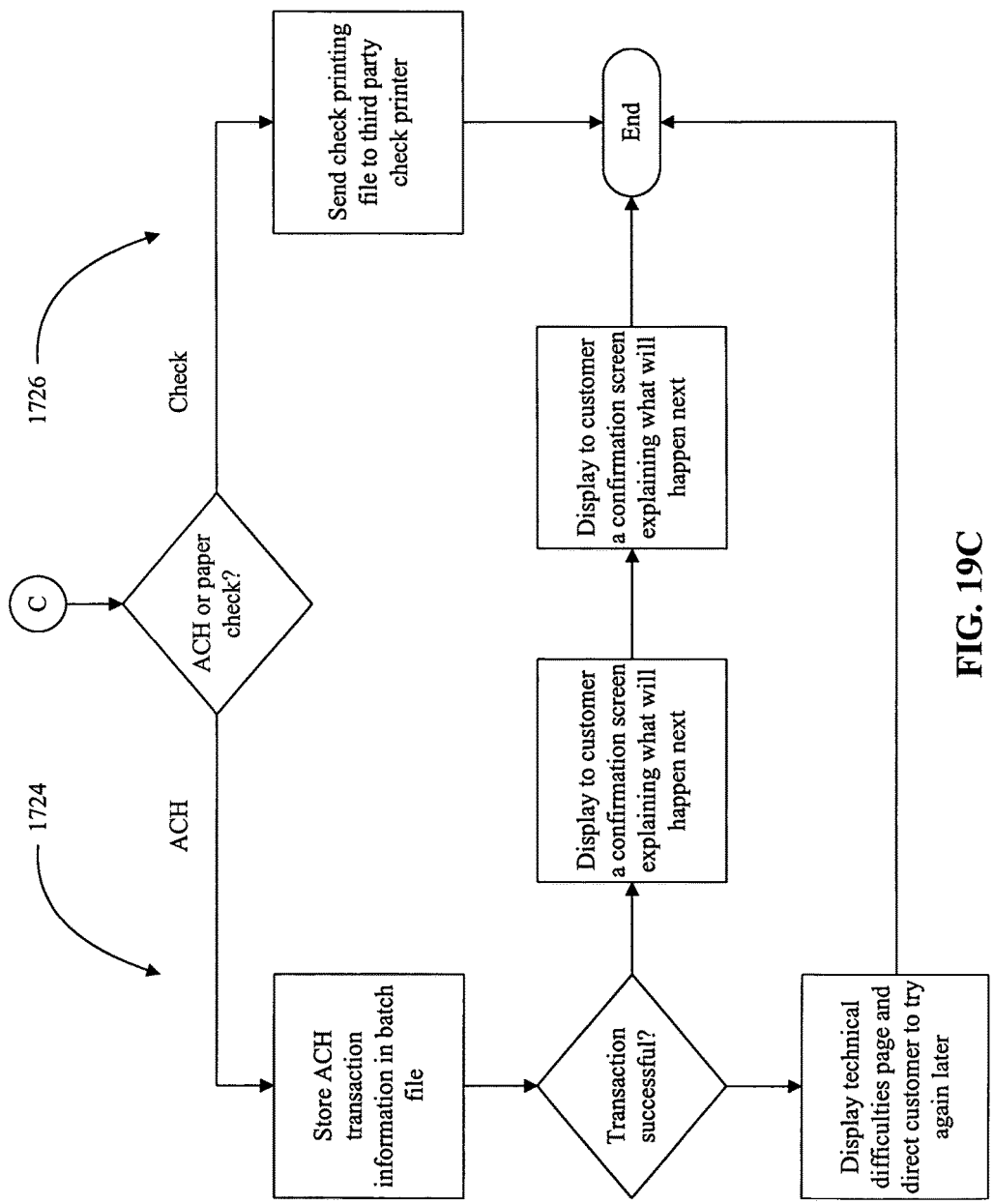

Referring now to FIG. 19C, if an ACH transaction is selected by the recipient 18, the data base 38 stores the ACH transaction in the daily batch file. If storage of the ACH transaction is not successful, the web site 34 displays a "technical difficulties page" and instructs the recipient 18 to come back to the web site 34 at a later time to complete the transaction. If storage of the ACH transaction is successful, the web site 34 displays a "confirmation page" which provides information of what will happen next and instructs the recipient 18 to exit the web site 34 or begin another transaction. Once the "confirmation page" is displayed, the database 36 sends confirmation e-mail messages to the recipient 18 informing them that the transaction is complete. The money-mailing-system database 38 collects the daily batch entries and sends them to the bank ACH 56 which executes a debit to the settlement account and a credit to the receiver's account.

If the recipient 18 chooses to receive a paper check, the money mailing system 10 prompts the recipient 18 for a physical mailing address and executes the paper check process 1726. As shown in FIG. 19C, the money-mailing system database 38 sends a "cut check" request to a third party check processing facility or the bank check printing service 254. The third party check processing facility or the bank check printing service 254 sends a paper check to the recipient 18 via a physical mail service and the bank holding or settlement account is debited once the paper check is cashed.

It is noted that the above-described money-mailing methods operate in a seamless manner and the identified divisions between the various stages is for descriptive purposes only. It is also noted that each of the stages and/or steps within each stage are not required for each transaction and each of the stages and/or steps within each stage can occur in a different order except as specifically noted. Upon concluding the ACH process 1724 or the paper check process 1726, the money-mailing system 10 executes the settlement process 1728.

Figure 20:
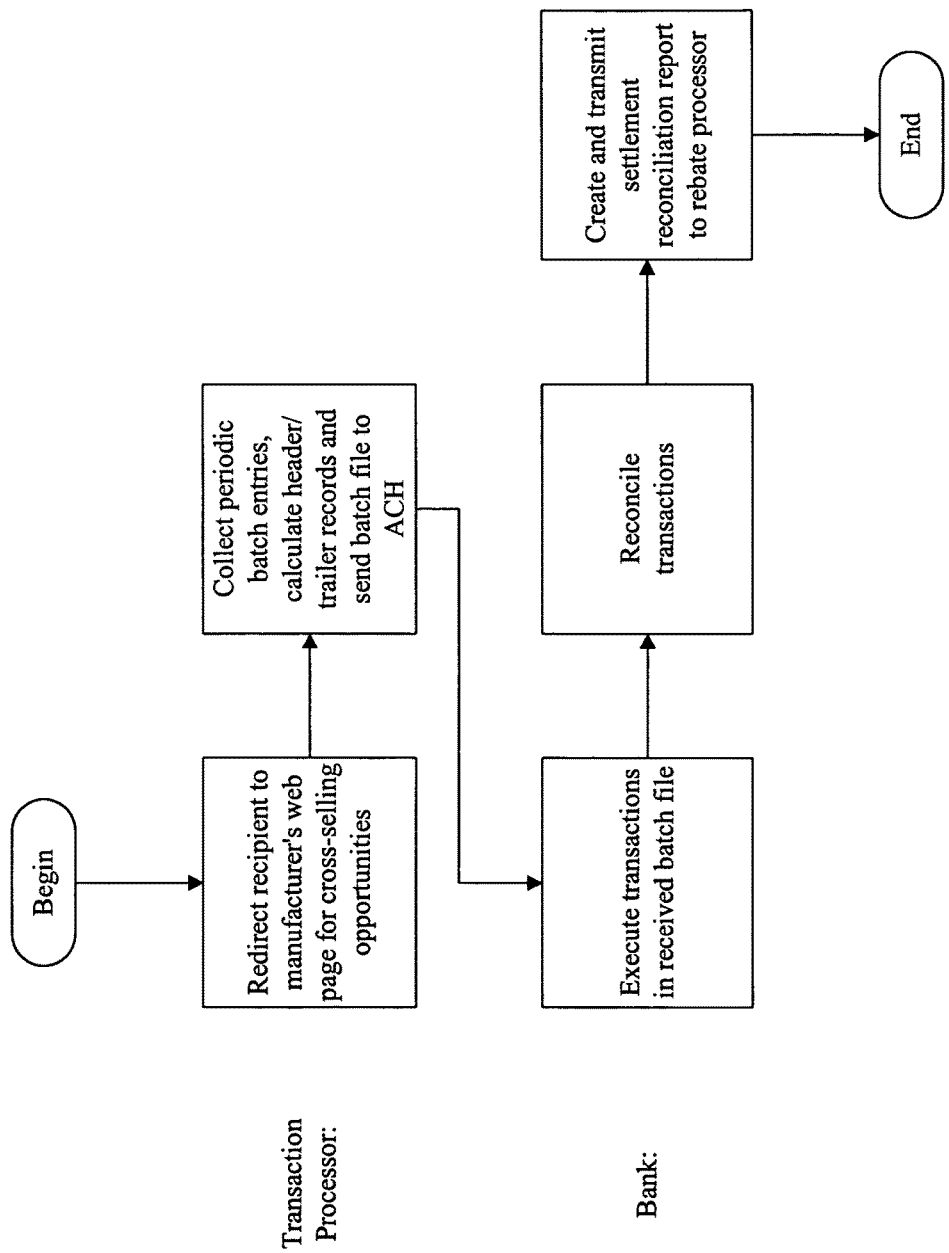
FIG. 20 is a flow chart illustrating the steps of the settlement process of FIG. 17.

FIG. 20 illustrates the preferred steps of the settlement process. Preferably, during or after the settlement process, the transaction processor redirects the recipient to the product manufacturer's web site. The manufacturer may use the web site to present cross-sell opportunities, free offers or product information to the recipient. The manufacturer may also use the web site to thank the recipient for his/her patronage.

As part of the settlement process, the transaction processor periodically collects data associated with transactions processed during the period and transmits the data in a batch file to the ACH for processing. The bank or ACH receives the batch file and executes the transactions based on the data in the batch file. The bank or ACH also reconciles the accounts affected by the transactions, creates a reconciliation report, and transmits the reconciliation report to the manufacture or transaction processor.

Figure 21:
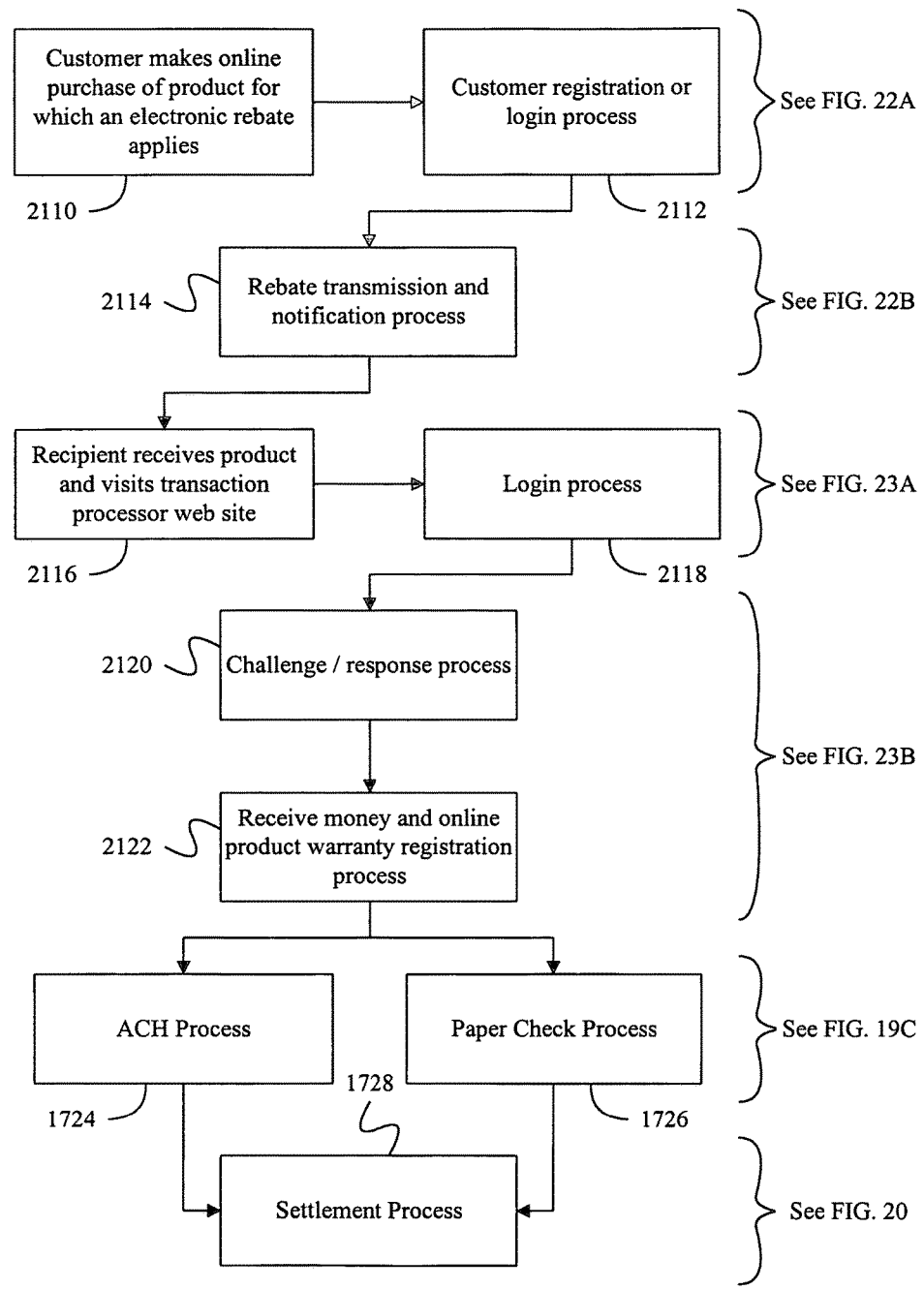
FIG. 21 is a flow chart diagrammatically illustrating methods for sending and receiving over a computer network using the money-mailing system of FIG. 1 rebate funds associated with an online purchase.

FIGS. 21-23 illustrate preferred methods according to the present invention for sending and receiving funds over a computer network such as the Internet 12 using the money-mailing system 10 of FIG. 1, where the funds represent a rebate associated with an online sale of goods or services. Referring to FIG. 21, there is illustrated a method for initiating a rebate funds transfer associated with an online sale of goods and services, including blocks 2110, 2112 and 2114.

The first stage 2110 of the rebate funds initiation method is an online product purchase process. The second stage 2112 of the rebate funds initiation method is a customer registration/login process. The steps of both the purchase and registration processes are shown in more detail with reference to FIG. 22A.

Figure 22A:
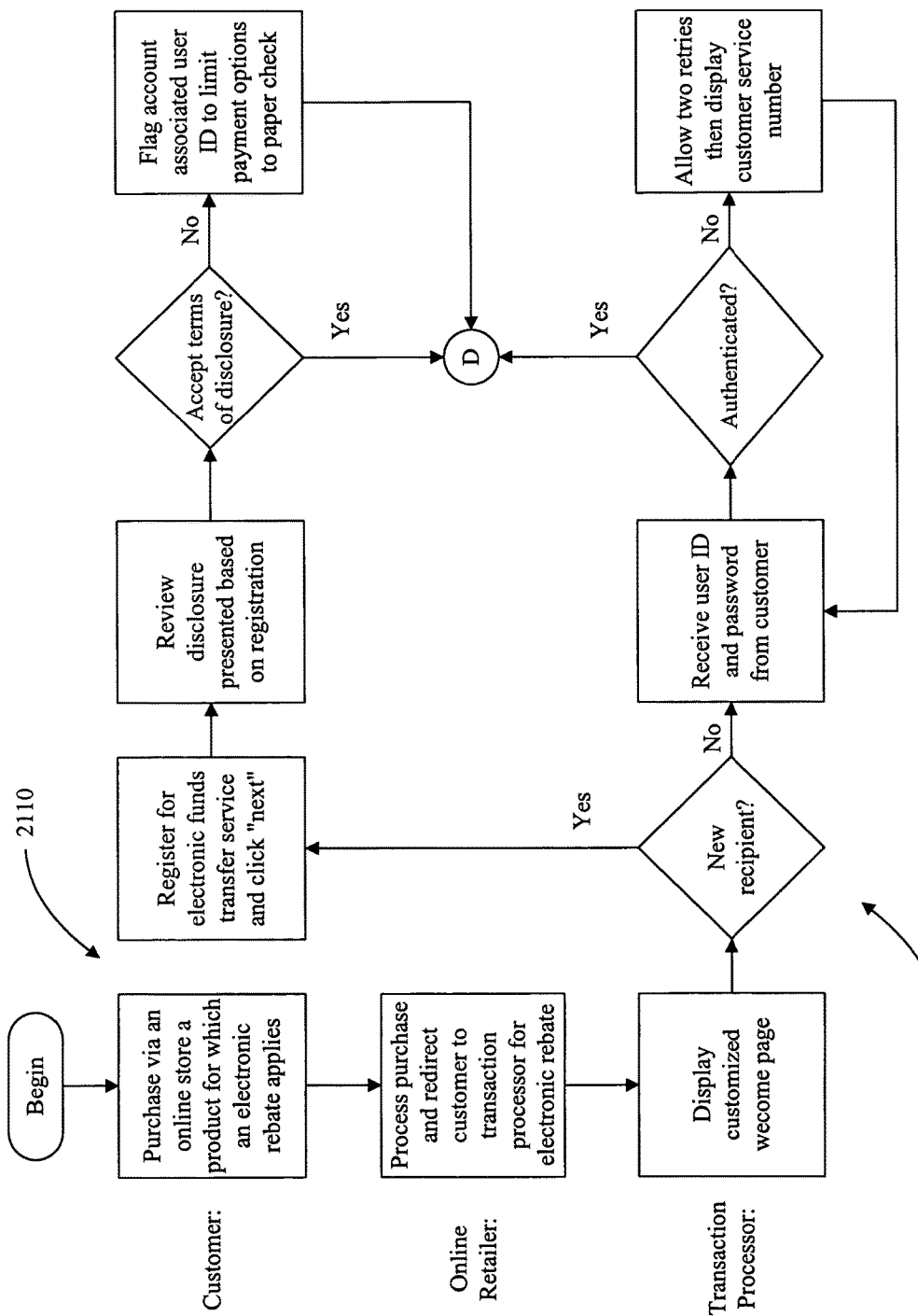

According to the product purchase and registration process shown in FIG. 22A, the customer purchases online an item for which an electronic rebate is offered, and the online retailer processes the purchase. During the course of, or immediately following, the purchase, the online retailer automatically redirects the customer to a transaction processor web site to complete an online registration or login process, generally referred to as 2112.

Upon establishing a connection with the customer, the transaction processor displays a customized web page welcoming the customer. The transaction processor determines whether the customer is a new recipient. If the customer is a first time recipient, the web site 34 displays a "new recipient page" and requests the recipient 18 to register as a recipient by providing recipient-identification information which can be similar to the sender-identification information 106. Once the requested recipient-identification information is input, the recipient 18 clicks on a "next" button via a mouse to continue. The web site 34 then displays a "disclosure page" showing a disclosure regarding the terms and conditions for using money-mailing system 10 and requests the recipient 18 to read the disclosure and indicate whether he/she accepts the terms of the disclosure. If the recipient 18 accepts the terms of the disclosure, execution continues at block 2114. If the recipient 18 does not accept the terms of the disclosure, the web site 34 flags the recipient's account to limit the account's payment options to receiving paper check, and execution continues at block 2114.

If the recipient 18 is not a first time recipient, he/she is requested to enter his/her user ID and password to authenticate the customer's identity to the money-mailing system 10. The money-mailing system 10 then authenticates that the login name and the password input by the recipient 18 are for a customer in "good standing". If the input information cannot be authenticated, the recipient 18 is preferably given at least one additional try to input the information. If the recipient 18 fails to be authenticated within a predetermined number of retries, the web site 34 displays an "exit page" which preferably provides a phone number for the customer service department 64. If the recipient 18 is authenticated, the money-mailing system 10 proceeds to the rebate transmission and notification process 2114.

The third stage 2114 of the rebate funds initiation method is a rebate transmission and notification process, effectively "attaching" the funds to an electronic mail message once the customer verifies receipt of the purchased product. The process is shown in more detail with reference to FIG. 22B. The process begins with the transaction processor displaying instructions informing the recipient 18 to return to the transaction processor web site after receiving the product. These instructions may be displayed via a web page or may be included in an electronic message sent to the recipient 18. The transaction processor further communicates a valid Universal Product Code ("UPC") and serial number to the recipient 18 for use as a response to a challenge question. Preferably, the challenge/response information is transmitted via an electronic message so that the recipient may retain it for future reference.

Periodically, the transaction processor determines whether there is an unclaimed rebate awaiting redemption by the recipient 18. If there is a rebate waiting, the transaction processor sends an electronic mail message to the recipient to remind the recipient of the unclaimed rebate. The transaction processor may limit the number of reminders to a reasonable number, such as four.

Figure 23A:
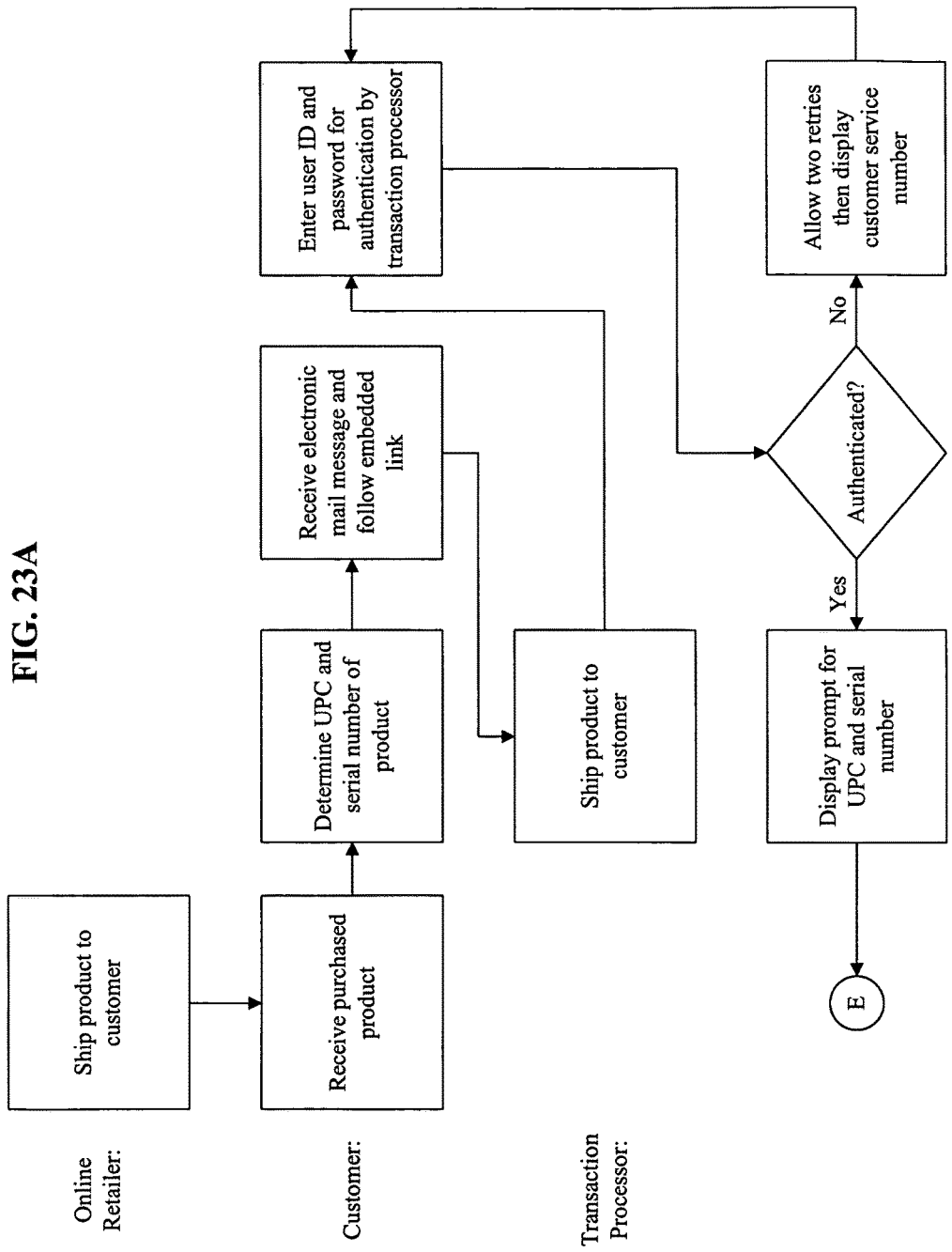
FIGS. 23A-23B are flow charts illustrating various processes comprising the method for delivering a rebate and transferring associated funds, generally depicted in FIG. 21.

Referring back to FIG. 21, the method for transferring rebate funds associated with an online purchase generally includes steps 2116-2122, and 1724-1728. In the first stage of the method, shown in detail in FIG. 23A, the recipient 18 receives the purchased product and visits the transaction processor web site. As shown by FIG. 23A, the online retailer ships the product purchased online by the customer/recipient 18. Upon receiving the product, recipient 18 determines the UPC and serial number of the received product. In accordance with the electronic mail reminder received from the transaction processor, recipient 18 visits the web site of the transaction processor, preferably by following a link embedded in the message.

Once a connection between the recipient 18 and the web site 34 is established, a customized web page is displayed, and the user is required to enter a user ID and password. If the input information cannot be authenticated, the recipient 18 is preferably given at least one additional try to input the information. If the recipient 18 fails to be authenticated within a predetermined number of retries, the web site 34 displays an "exit page" which preferably provides a phone number for the customer service department. If the recipient 18 is authenticated, the recipient 18 is prompted for the UPC and serial number of the purchased product.

Figure 23B:
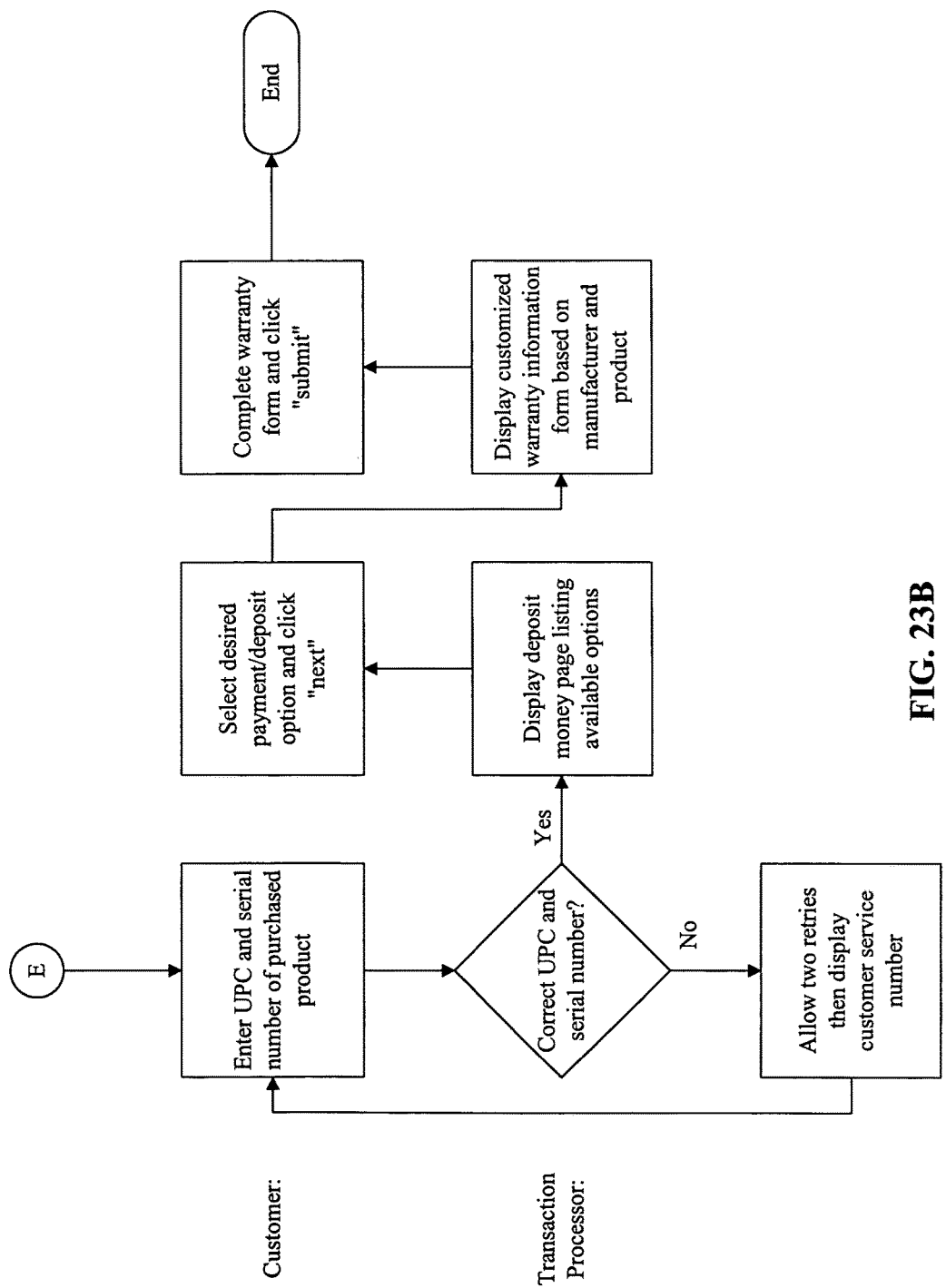

Referring now to FIG. 23B, recipient 18 enters the response to the challenge question, and the transaction processor determines whether the entered UPC and serial number match those of a valid rebate transaction. If the UPC and serial number do not match those of a valid rebate transaction, recipient 18 is allowed to provide the correct information within a predetermined number of retries. If the UPC and serial number are valid, the transaction processor displays a warranty registration page, customized based on the purchased product and manufacturer, and the recipient is requested to provide warranty information and click "submit."

After registering the warranty information, the transaction processor displays a "deposit money" page listing the available payment options. The recipient 18 selects the desired option and clicks "next." Of course, the recipient 18 is presented various payment options only if he/she previously accepted the terms and conditions displayed by the transaction processor during the user registration process. Upon the recipient's selection of the desired payment option, the money-mailing system 10 executes blocks 1724, 1726 and 1728, previously described with reference to FIGS. 17, 19C and 20.

It is apparent from the above description that the money-mailing system and method of the present invention enable one computer user (the online retailer) to easily and rapidly send a rebate to another computer network user (the recipient) by "attaching" the rebate funds to an electronic message.

Although particular embodiments of the invention have been described in detail, it is understood that the present invention is not limited correspondingly in scope, but includes all changes and modifications known to those skilled in the art and all changes and modifications coming within the spirit and terms of the claims appended hereto.

What is claimed is:

1. A method for processing a funds transfer representing a rebate associated with a product purchased by a customer, the method comprising:

after purchase of the product by the customer, a rebate computer processor inputting a completed rebate application received over a computer network from the customer and including rebate information, the rebate information comprising:

a request to initiate a funds transfer associated with the product purchase;

a recipient identifier identifying a rebate recipient;

amount data representing an amount of money to be rebated to the rebate recipient; and product data including a universal product code of the product that was purchased and a serial number of the product that was purchased;

the rebate computer processor verifying that the universal product code of the product that was purchased and the serial number of the product that was purchased match those of an eligible rebate transaction;

the rebate computer processor creating a single electronic file comprising a plurality of verified rebate applications received during a time period, the rebate processor outputting the single electronic file to a transaction computer processor;
wherein the transaction computer processor:
parses the single electronic file into a plurality of individual transaction records, each transaction record comprising an electronic message including embedded funds transfer data based on the rebate information;
assigns a transaction ID to each transaction record; and creates an individual electronic message for each rebate application; and
the rebate computer processor sending the electronic message to each rebate recipient over the computer network using the recipient identifier, which was received from the rebate recipient, to inform the rebate recipient that the rebate request has been processed.

2. The method of claim 1, wherein the electronic message includes the universal product code and serial number.

3. The method of claim 1, further including the step of the rebate computer processor inputting the information based on a rebate application received from the rebate recipient.

4. The method of claim 3, the rebate computer processor creating an electronic batch file for a plurality of rebate applications received during a predetermined period of time.

5. The method of claim 4, further including parsing the electronic batch file into individual transaction records, each being associated with a respective recipient identifier.

6. The method of claim 1, wherein the single electronic file is a batch file containing the plurality of rebate applications during the time period.

7. The method of claim 6, the individual electronic message for each rebate application is constituted by an email message for each rebate application.

8. The method of claim 1, further including generating and displaying, to the customer, a warranty registration page, the warranty registration page being displayed upon determining that both the universal product code of the product that was purchased and the serial number of the product that was purchased are valid, and the warranty registration page being presented to the customer to request the customer to input warranty information.

9. The method of claim 8, further including the warranty registration page being customized based on the purchased product and manufacturer.

10. The method of claim 1, further including, subsequent to the universal product code of the product that was purchased and the serial number of the product that was purchased being received from the customer, generating and displaying, to the customer, a warranty registration page, the warranty registration page being displayed upon determining that both the universal product code of the product that was purchased and the serial number of the product that was purchased are valid, and
the warranty registration page being presented to the customer to request the customer to input warranty information.

11. A method for delivering a rebate to a customer, who constitutes a recipient of the rebate, and completing a funds transfer associated with a product purchase, the method comprising the steps of:
the rebate recipient making a purchase of the product and, subsequent to making the purchase, the recipient identifying product data including a universal product code of the product that was purchased and a serial number of the product that was purchased, the purchase being made via an online seller;
redirecting the rebate recipient from the online seller to a web site so as to effect delivery of the rebate;
receiving, by a computer processor, over a computer network, from the rebate recipient and subsequent to the rebate recipient making the purchase, a submission of information, the information received from the recipient including:
a request to receive a rebate associated with a product purchase;
a transaction identifier identifying the funds transfer associated with the product purchase; and
the product data including the universal product code of the product that was purchased and the serial number of the product that was purchased;
transferring funds, by the computer processor, based on the information that was received in the submission of information and information that is retrieved by the web site based on the transaction identifier, to a deposit account associated with the rebate recipient including:
verifying that the universal product code of the product that was purchased and the serial number of the product that was purchased match those of an eligible rebate transaction;
creating a single electronic file comprising a plurality of verified rebate applications during a time period, and outputting the single electronic file to a transaction computer processor; and
parsing the single electronic file a plurality of individual transaction records, each transaction record comprising an electronic message including embedded funds transfer data based on the rebate information;
assigning a transaction ID to each transaction record; and
creating an individual electronic message for each rebate application; and
outputting the individual electronic message to perform the funds transfer for the rebate to each rebate recipient; and
determining, by the computer processor, a recipient identifier identifying the rebate recipient;
determining, by the computer processor, a computer processor identifier identifying the rebate computer processor; and
sending, by the computer processor, a confirmation of the funds transfer to the rebate computer processor and the rebate recipient over the computer network using the computer processor identifier and the rebate recipient identifier, respectively.

12. The method of claim 11, wherein the transaction identifier includes a challenge/response.

13. The method of claim 12, wherein the challenge/response includes a universal product code and a serial number each associated with the product.

14. The method of claim 11, wherein the step of transferring includes the step of generating a paper check.

15. The method of claim 11, further including the step of registering the rebate recipient as a valid user.

16. The method of claim 11, wherein the step of receiving includes:
receiving from the rebate recipient a user identifier and password; and
wherein the method further includes the step of verifying that the rebate recipient is a valid user based on the user identifier and password.

17. An apparatus for initiating a funds transfer representing a rebate associated with a product purchase by a rebate recipient, the apparatus comprising:
   a computer processor; and
   a memory connected to said computer processor storing a program to control the operation of said computer processor;
   the processor operative with the program in the memory to:
      monitor a claim of the rebate submitted by the rebate recipient, and sending a reminder communication to the recipient once the rebate has not been claimed for a period of time;
      receive over the computer network from a rebate computer processor:
         a request to initiate a funds transfer associated with the product purchase, the product being purchased by the rebate recipient;
         a recipient identifier identifying the rebate recipient;
         amount data representing an amount of money to be rebated to the rebate recipient; and
         product data identifying the particular individual product that was purchased by the rebate recipient, the product data including a universal product code of the product that was purchased and a serial number of the product that was purchased;
      verify that the universal product code of the product that was purchased and the serial number of the product that was purchased match those of an eligible rebate transaction;
      generate an electronic message, including embedded funds transfer data disposed in the electronic message, including:
         creating a single electronic file comprising a plurality of verified rebate applications received during a time period, and outputting the single electronic file to a transaction computer processor; and
      the transaction computer processor:
         parsing the single electronic file into a plurality of individual transaction records, each transaction record comprising an electronic message including embedded funds transfer data based on the rebate information;
         assigning a transaction ID to each transaction record; and
         creating an individual electronic message for each rebate application; and
      the computer processor sending the electronic message to each rebate recipient over the computer network using the recipient identifier to inform the rebate recipient that the rebate request has been processed
      and the computer processor performing processing to determine whether the universal product code of the product that was purchased and the serial number of the product that was purchased match those of a valid rebate transaction.

18. The apparatus of claim 17, wherein the computer processor is further operative with the program in the memory to receive over the computer network from the rebate computer processor product data including a universal product code and a serial number.

19. The apparatus of claim 18, wherein the electronic message includes the universal product code and serial number.

20. An apparatus for delivering a rebate and completing a funds transfer associated with a product purchase, the apparatus comprising:
   a computer processor; and
   a memory connected to said computer processor storing a program to control the operation of said computer processor;
   the computer processor operative with the program in the memory to:
      receive over a computer network from a rebate recipient:
         a request to receive a rebate associated with a product that has been previously purchased utilizing a separate computer processor; and
         a transaction identifier identifying the funds transfer associated with the product purchase;
      transfer funds to a deposit account associated with the rebate recipient including:
         verifying that the universal product code of the product that was purchased and the serial number of the product that was purchased match those of an eligible rebate transaction;
         creating a single electronic file comprising a plurality of verified rebate applications received during a time period, and outputting the single electronic file to a transaction computer processor; and
         parsing the single electronic file into a plurality of individual transaction records, each transaction record comprising an electronic message including embedded funds transfer data based on the rebate information;
         assigning a transaction ID to each transaction record; and
         creating an individual electronic message for each rebate application; and
         outputting the individual electronic message to perform the funds transfer for the rebate to the rebate recipient; and
      the computer processor performing further processing including:
         determining a recipient identifier identifying the rebate recipient;
         determining a computer processor identifier identifying the rebate computer processor; and
         send a confirmation of the funds transfer to the rebate computer processor and each rebate recipient over the computer network using the computer processor identifier and the recipient identifier, respectively.

21. The apparatus of claim 20, wherein the transaction identifier includes a challenge/response.

22. The apparatus of claim 21, wherein the challenge/response includes a universal product code and a serial number each associated with the product.

23. The apparatus of claim 20, wherein the computer processor is further operative with the program in the memory to generate a paper check.

24. The apparatus of claim 20, wherein the computer processor is further operative with the program in the memory to register the rebate recipient as a valid user.

25. The method of claim 20, wherein the computer processor is further operative with the program in the memory to:
   receive from the rebate recipient a user identifier and password; and
   verify that the rebate recipient is a valid user based on the user identifier and password.

26. An apparatus that initiates a funds transfer representing a rebate associated with a product purchase, the apparatus comprising:

a receiving portion that receives over the computer network from a rebate computer processor:
  a request to initiate a funds transfer associated with the product purchase;
  a recipient identifier identifying a rebate recipient;
  amount data representing an amount of money to be rebated; and
  product data including a universal product code of the product that was purchased and a serial number of the product that was purchased;
a generating portion that generates an electronic message that includes embedded funds transfer data, the generates an electronic message including:
  verifying that the universal product code of the product that was purchased and the serial number of the product that was purchased match those of an eligible rebate transaction;
  creating a single electronic file comprising a plurality of verified rebate applications received during a time period, and outputting the single electronic file to a transaction computer processor; and
the transaction computer processor:
  parsing single electronic file into a plurality of individual transaction records, each transaction record comprising an electronic message including embedded funds transfer data based on the rebate information;
  assigning a transaction ID to each transaction record; and
  creating an individual electronic message for each rebate application; and
a sending portion that sends the electronic message to each rebate recipient over the computer network using the recipient identifier to inform the recipient that the rebate request has been processed.

27. The apparatus of claim 26, further including a further receiving portion that receives over the computer network from the rebate computer processor product data including a universal product code of the product and a serial number of the product.

28. The apparatus of claim 27, wherein the electronic message includes the universal product code and serial number.

29. An apparatus that delivers a rebate and completing a funds transfer associated with a product purchase, the apparatus comprising:
  a receiving portion that receives over a computer network from a rebate recipient information including:
    a request to receive a rebate associated with a product purchase, the product having been previously purchased and the rebate recipient previously verifying receipt of the purchased product; and
    a transaction identifier identifying the funds transfer associated with the product purchase;
  a transferring portion, in the form of a processing machine, that transfers funds, based on the information, to a deposit account associated with the rebate recipient, the transfer funds including:
    verifying that the universal product code of the product that was purchased and the serial number of the product that was purchased match those of an eligible rebate transaction;
    creating a single electronic file comprising a plurality of verified rebate applications received during a time period, and outputting the single electronic file to a transaction computer processor; and
    parsing the single electronic file into a plurality of individual transaction records, each transaction record comprising an electronic message including embedded funds transfer data based on the rebate information;
    assigning a transaction ID to each transaction record; and
    creating an individual electronic message for each rebate application; and
    outputting the individual electronic message to perform the funds transfer for the rebate to each rebate recipient; and
  the transferring portion performing processing including:
    a first determining portion that determines a recipient identifier identifying the rebate recipient;
    a second determining portion that determines a computer processor identifier identifying the rebate computer processor; and
    a sending portion that sends a confirmation of the funds transfer to the rebate computer processor and the rebate recipient over the computer network using the computer processor identifier and the recipient identifier, respectively.

30. The apparatus of claim 29, wherein the transaction identifier includes a challenge/response.

31. The apparatus of claim 30, wherein the challenge/response includes a universal product code and a serial number each associated with the product.

32. The apparatus of claim 29, further including a generating portion that generates a paper check.

33. The apparatus of claim 29, further including a registering portion that registers the rebate recipient as a valid user.

34. The apparatus of claim 29, further including:
  a further receiving portion that receives from the rebate recipient a user identifier and password; and
  a verifying portion that verifies that the rebate recipient is a valid user based on the user identifier and password.

* * * * *